(12) United States Patent
Fradkin et al.

(10) Patent No.: US 9,176,677 B1
(45) Date of Patent: Nov. 3, 2015

(54) VIRTUAL PROVISIONING SPACE RESERVATION

(75) Inventors: Igor Fradkin, Sharon, MA (US); Alex Veprinsky, Brookline, MA (US); John Fitzgerald, Mansfield, MA (US); Magnus Bjornsson, Sudbury, MA (US)

(73) Assignee: EMC Corporation, Hopkinton, MA (US)

( * ) Notice: Subject to any disclaimer, the term of this patent is extended or adjusted under 35 U.S.C. 154(b) by 437 days.

(21) Appl. No.: 12/924,474

(22) Filed: Sep. 28, 2010

(51) Int. Cl.
*G06F 3/00* (2006.01)
*G06F 3/06* (2006.01)

(52) U.S. Cl.
CPC ............ *G06F 3/0644* (2013.01); *G06F 3/0665* (2013.01); *G06F 3/0608* (2013.01)

(58) Field of Classification Search
CPC ... G06F 3/0631; G06F 3/0665; G06F 3/0689; G06F 3/0644; G06F 12/00; G06F 12/0223
See application file for complete search history.

(56) References Cited

U.S. PATENT DOCUMENTS

| | | | |
|---|---|---|---|
| 5,206,939 A | 4/1993 | Yanai et al. | |
| 5,742,792 A | 4/1998 | Yanai et al. | |
| 5,778,394 A | 7/1998 | Galtzur et al. | |
| 5,845,147 A | 12/1998 | Vishlitzky et al. | |
| 5,857,208 A | 1/1999 | Ofek | |
| 2006/0069887 A1 | 3/2006 | LeCrone et al. | |
| 2009/0070541 A1 | 3/2009 | Yochai et al. | |
| 2009/0240880 A1* | 9/2009 | Kawaguchi | 711/114 |
| 2009/0276588 A1* | 11/2009 | Murase | 711/160 |
| 2011/0153977 A1* | 6/2011 | Root et al. | 711/171 |

OTHER PUBLICATIONS

"EMC CLARiiON Virtual Provisioning, Applied Technology," EMC Corporation, White paper, Aug. 2008, 16 pp.
"EMC Symmetrix Virtual Provisioning, Applied Technology," EMC Corporation, White paper, Jun. 2008, 12 pp.
"Implementing Virtual Provisioning on EMC Symmetrix DMX with VMware Virtual Infrastructure," EMC Corporation, White paper, 2008, 30 pp.
U.S. Appl. No. 11/823,156, filed Jun. 27, 2007, Burke et al.
U.S. Appl. No. 11/823,152, filed Jun. 27, 2007, Burke.
U.S. Appl. No. 11/903,869, filed Sep. 25, 2007, Veprinsky.
U.S. Appl. No. 12/586,837, filed Sep. 29, 2009, LeCrone et al.
U.S. Appl. No. 12/592,988, filed Dec. 7, 2009, Martin et al.

* cited by examiner

*Primary Examiner* — Gurtej Bansal
*Assistant Examiner* — Thanh D Vo
(74) *Attorney, Agent, or Firm* — Muirhead and Saturnelli, LLC

(57) ABSTRACT

Guaranteeing space availability for thin devices includes reserving space without committing, or fully pre-allocating, the space to specific thin device ranges. Space may be held in reserve for a particular set of thin devices and consumed as needed by those thin devices. The system guards user-critical devices from running out of space, for example due to a "rogue device" scenario in which one device allocates an excessive amount of space. The system uses a reservation entity, to which a thin device may subscribe, which reserves space for the thin device without allocating that space before it is need to service an I/O request.

24 Claims, 18 Drawing Sheets

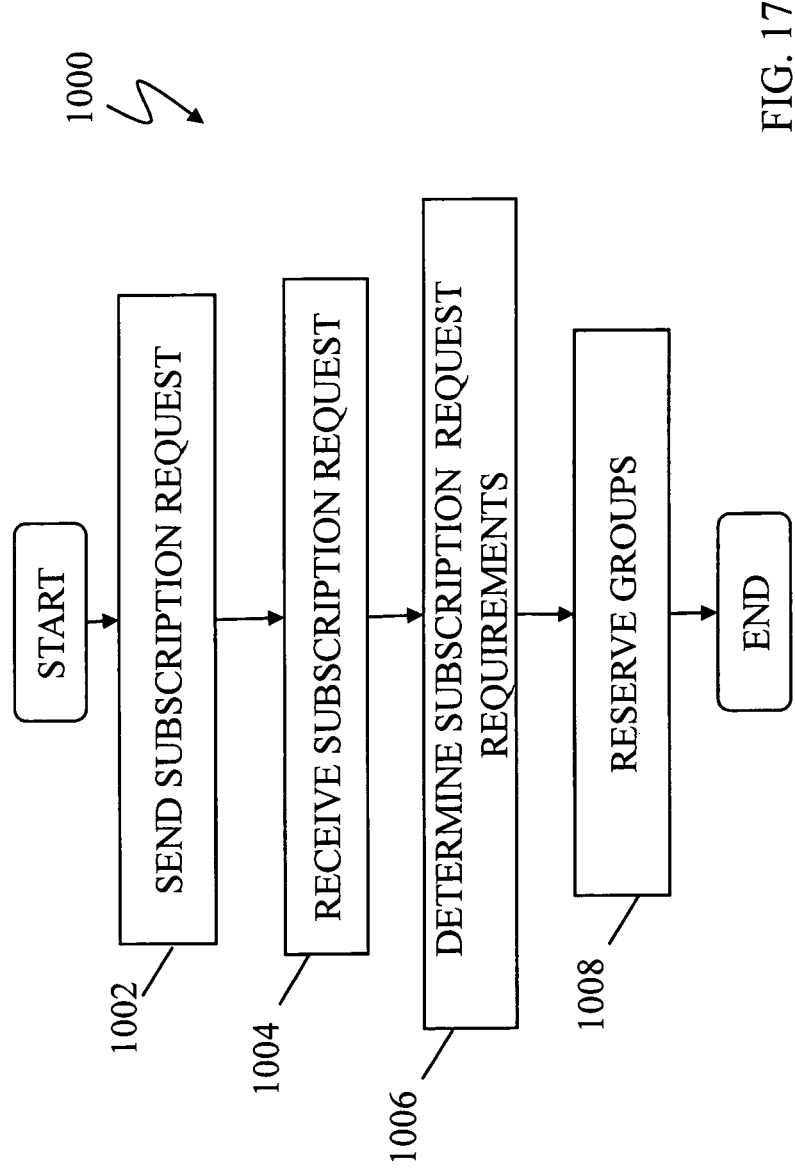

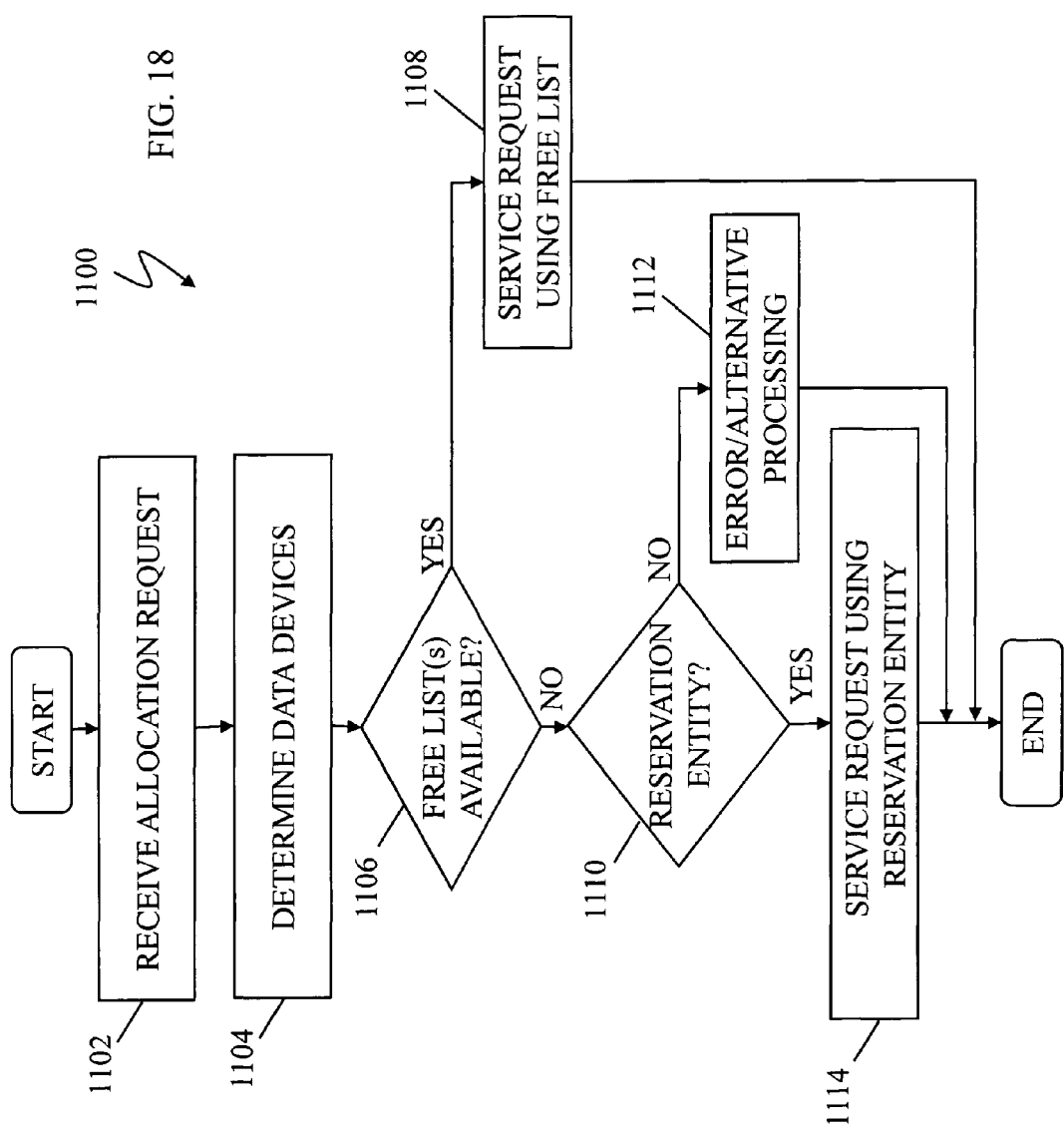

VIRTUAL PROVISIONING SPACE RESERVATION

TECHNICAL FIELD

This application relates to storage devices and, more particularly, to the field of data management of data stored on storage devices.

BACKGROUND OF THE INVENTION

Host processor systems may store and retrieve data using storage devices containing a plurality of host interface units (host adapters), disk drives, and disk interface units (disk adapters). Such storage devices are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek, which are incorporated herein by reference. The host systems access the storage device through a plurality of channels provided therewith. Host systems provide data and access control information through the channels of the storage device and the storage device provides data to the host systems also through the channels. The host systems do not address the disk drives of the storage device directly, but rather, access what appears to the host systems as a plurality of logical volumes. Different sections of the logical volumes may or may not correspond to the actual disk drives.

Thin provisioning (also referred to as virtual provisioning) storage systems present a large amount of storage capacity to a host, but consume space only as needed from a shared pool. The devices of thin provisioning are known as thin devices or thin LUNs. With thin devices, the host visible capacity (e.g., storage perceived by the applications) is larger than the actual allocated space on the storage system. This simplifies the creation and allocation of storage capacity. Thin devices may be sized to accommodate growth without regard for currently available assets. Physical storage is assigned to the server in a capacity-on-demand fashion from a shared pool.

To guarantee that sufficient allocated space is available when needed in a thin provisioning environment, known techniques provide that extents on storage devices may be pre-allocated when thin devices are bound to a thin storage pool. Binding a thin device to a pool associates the thin device with the pool. Users may pre-allocate space to certain volumes of thin devices or may pre-allocate entire thin devices. When space is pre-allocated, that space may be reserved for the thin device starting at the beginning of the thin device. For example, if 100 MB is pre-allocated when a thin device is bound to a storage pool, the space for the first 100 MB of the thin device may be allocated in the storage pool. Any writes to the pre-allocated area of the thin device do not result in additional allocation in the storage pool. This approach to guarantee allocation, however, may result in various storage space inefficiencies, since it requires that the allocated thin device capacity be held "in reserve" and thereby reduces the "thinness" property of the thin device.

Accordingly, it would be desirable to implement a system that guarantees space availability for thinly-provisioned devices in a way that reduces the need for pre-allocating space or otherwise committing space ahead of time to specific thin devices.

SUMMARY OF THE INVENTION

According to the system described herein, a method for reserving storage space in a thin provisioning environment includes receiving a space reservation request from a first device, wherein the space reservation request identifies an amount of space requested for reservation for the first device from a storage pool. A reservation entity is maintained that identifies reserved space in the storage pool corresponding to the request from the first device, wherein the reserved space in the storage pool that is identified by the reservation entity is reserved for the first device and is not yet allocated to the first device. The reservation entity is used according to a policy in connection with allocating space to service an I/O request involving the first device. Information in the first device may be maintained that identifies the reservation entity and the amount of space requested for reservation for the first device. The reservation entity may communicate with at least one device reserved list of a second device, the at least one device reserved list identifying reserved storage space on the second device. The first device may include a thin device, and wherein the second device may include a data device. The reservation entity may communicate with a plurality of device reserved lists for a plurality of second devices. The plurality of second devices may be contained in the same storage pool or may be contained across multiple storage pools. The policy may include using the reserved space of the reservation entity if free unallocated space in the storage pool is unavailable, the free unallocated space being space that is not reserved by the reservation entity.

According further to the system described herein, a non-transitory computer readable medium stores software for reserving storage space in a thin provisioning environment. The software includes executable code that receives a space reservation request from a first device, wherein the space reservation request identifies an amount of space requested for reservation for the first device from a storage pool. Executable code may be provided that maintains a reservation entity that identifies reserved space in the storage pool corresponding to the request from the first device, wherein the reserved space in the storage pool that is identified by the reservation entity is reserved for the first device and is not yet allocated to the first device. Executable code may be provided that uses the reservation entity in connection with allocating space to service an I/O request involving the first device. Executable code may be provided that maintains information in the first device that identifies the reservation entity and the amount of space requested for reservation for the first device. The reservation entity may communicate with at least one device reserved list of a second device, the at least one device reserved list identifying reserved storage space on the second device. The first device may include a thin device and the second device may include a data device. The reservation entity may communicate with a plurality of device reserved lists for a plurality of second devices. The plurality of second devices may be contained in the same storage pool or across multiple storage pools. The policy may include using the reserved space of the reservation entity if free unallocated space in the storage pool is unavailable, the free unallocated space being space that is not reserved by the reservation entity.

According further to the system described herein, a method for allocating storage space in a thin provisioning environment includes receiving an allocation request from a first device to allocate space in a storage pool in connection with servicing an I/O request. Space may be allocated according to a policy involving a reservation entity that identifies reserved space in the storage pool corresponding to the request from the first device, wherein the reserved space in the storage pool that is identified by the reservation entity is reserved for the first device and is not yet allocated to the first device. The reservation entity may communicate with at least one device reserved list of a second device, the at least one device reserved list identifying reserved storage space on the second device. The first device may include a thin device, and wherein the second device includes a data device. The reservation entity may communicate with a plurality of device reserved lists for a plurality of second devices. The plurality of second devices may be contained in the same storage pool or across multiple storage pools. The policy may include using the reserved space of the reservation entity if free unallocated space in the storage pool is unavailable, the free unallocated space being space that is not reserved by the reservation entity.

According further to the system described herein, a non-transitory computer readable medium stores software for allocating storage space in a thin provisioning environment. The software may include executable code that receives an allocation request from a first device to allocate space in a storage pool in connection with servicing an I/O request. Executable code may be provided that allocates space according to a policy involving a reservation entity that identifies reserved space in the storage pool corresponding to the request from the first device, wherein the reserved space in the storage pool that is identified by the reservation entity is reserved for the first device and is not yet allocated to the first device. The reservation entity may communicate with at least one device reserved list of a second device, the at least one device reserved list identifying reserved storage space on the second device. The first device may include a thin device and the second device may include a data device. The reservation entity may communicate with a plurality of device reserved lists for a plurality of second devices. The plurality of second devices may be contained in the same storage pool or across multiple storage pools. The policy may include using the reserved space of the reservation entity if free unallocated space in the storage pool is unavailable, the free unallocated space being space that is not reserved by the reservation entity.

BRIEF DESCRIPTION OF THE DRAWINGS

Embodiments of the system are described with reference to the several figures of the drawings, which are briefly described as follows.

FIG. 17 is a flow diagram showing track group reservation processing according to an embodiment of the system described herein.

FIG. 18 is a flow diagram showing allocation processing according to an embodiment of the system described herein.

DETAILED DESCRIPTION OF VARIOUS EMBODIMENTS

Figure 1:
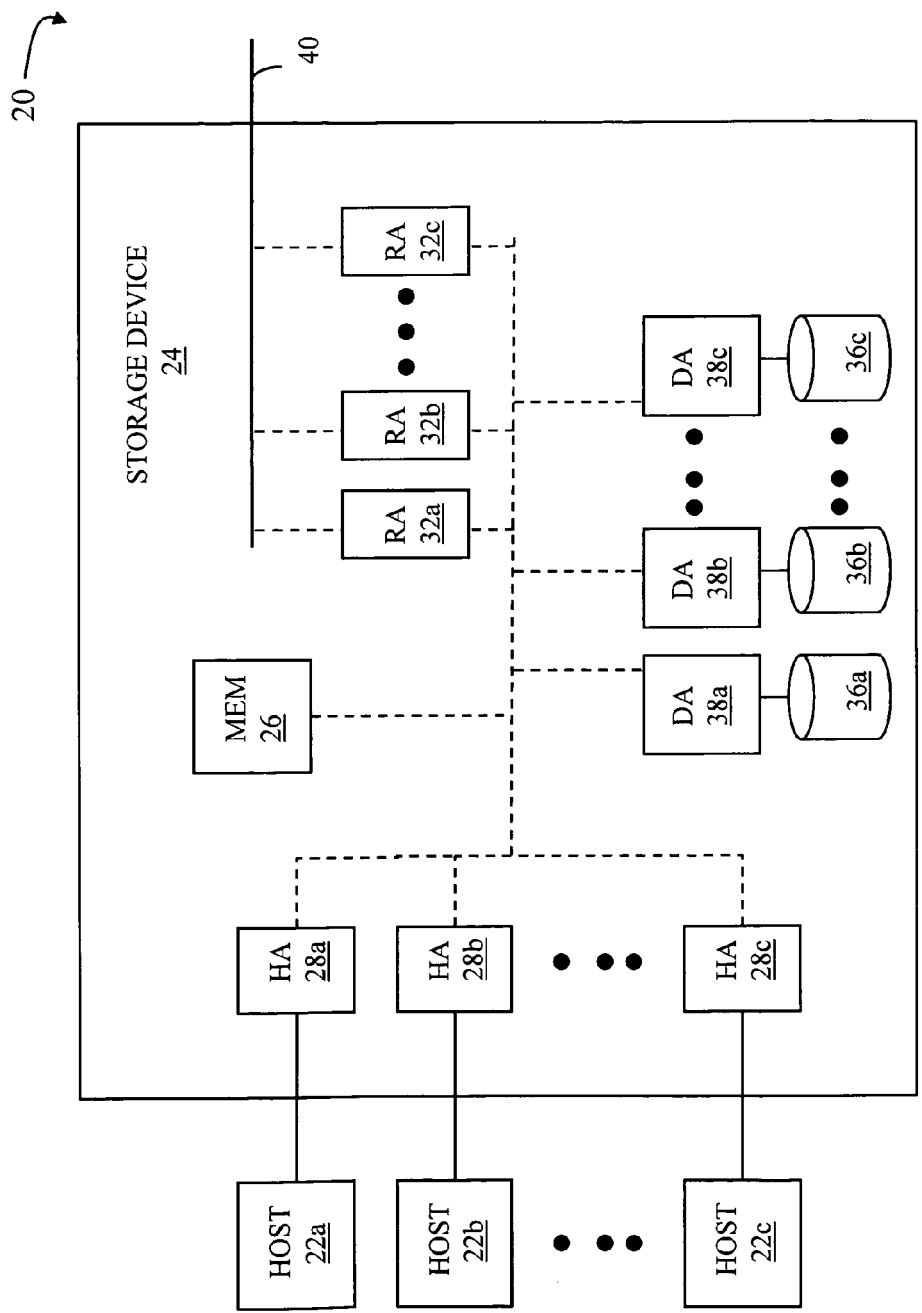
FIG. 1 is a schematic diagram showing a plurality of hosts and a data storage device that may be used in connection with the system described herein.

FIG. 1 is a schematic diagram 20 showing a plurality of hosts 22a-22c coupled to a data storage device 24. The data storage device 24 includes a memory 26 that facilitates operation of the storage device 24, as further described elsewhere herein. The data storage device also includes a plurality of host adapters (HA's) 28a-28c that handle reading and writing of data between the hosts 22a-22c and the storage device 24. Although the diagram 20 shows each of the hosts 22a-22c coupled to each of the HA's 28a-28c, it will be appreciated by one of ordinary skill in the art that one or more of the HA's 28a-28c may be coupled to other hosts.

The storage device 24 may include one or more Remote Data Facility (RDF) adapter units (RA's) 32a-32c. An RDF product, such as produced by EMC Corporation of Hopkinton, Mass., may be used to copy data from one storage device to another. For example, if a host writes data to a first storage device (e.g., a local storage device), it may be desirable to copy that data to a second storage device provided in a different location (e.g., a remote storage device). The RA's 32a-32c are coupled to an RDF link 40 and are similar to the HA's 28a-28c, but may be used to transfer data between the storage device 24 and other storage devices (see FIG. 3 and corresponding description) that are also coupled to the RDF link 40. The storage device 24 may be coupled to additional RDF links (not shown) in addition to the RDF link 40. For further discussion of RDF and the use thereof in data recovery and storage techniques, see, for example, U.S. Pat. No. 5,742, 792 to Yanai, et al., entitled "Remote Data Mirroring" and U.S. Patent App. Pub. No. 2006-0069887 to LeCrone, et al., entitled "Triangular Asynchronous Replication," which are incorporated herein by reference.

The storage device 24 may also include one or more disks 36a-36c, each containing a different portion of data stored on the storage device 24. Each of the disks 36a-36c may be coupled to a corresponding one of a plurality of disk adapter units (DA) 38a-38c that provides data to a corresponding one of the disks 36a-36c and receives data from a corresponding one of the disks 36a-36c. The disks 36a-36c may include any appropriate storage medium or mechanism, including hard disks, solid-state storage (flash memory), etc. Note that, in some embodiments, it is possible for more than one disk to be serviced by a DA and that it is possible for more than one DA to service a disk. It is noted that the term "data" as used herein may be appropriately understood, in various embodiments, to refer to data files, extents, blocks, chunks and/or other designations that indicate a unit, segment or collection of data.

The logical storage space in the storage device 24 that corresponds to the disks 36a-36c may be subdivided into a plurality of volumes or logical devices. The logical devices may or may not correspond to the physical storage space of the disks 36a-36c. Thus, for example, the disk 36a may contain a plurality of logical devices or, alternatively, a single logical device could span both of the disks 36a, 36b. The hosts 22a-22c may be configured to access any combination of logical devices independent of the location of the logical devices on the disks 36a-36c. A device, such as a logical device described above, has a size or capacity that may be expressed in terms of device geometry. The device geometry may include device geometry parameters regarding the number of cylinders in the device, the number of heads or tracks per cylinder, and the number of blocks per track, and these parameters may be used to identify locations on a disk. Other embodiments may use different structures.

One or more internal logical data path(s) exist between the DA's 38a-38c, the HA's 28a-28c, the RA's 32a-32c, and the memory 26. In some embodiments, one or more internal buses and/or communication modules may be used. In some embodiments, the memory 26 may be used to facilitate data transferred between the DA's 38a-38c, the HA's 28a-28c and the RA's 32a-32c. The memory 26 may contain tasks that are to be performed by one or more of the DA's 38a-38c, the HA's 28a-28c and the RA's 32a-32c and a cache for data fetched from one or more of the disks 36a-36c. Use of the memory 26 is further described elsewhere herein in more detail.

The storage device 24 may be provided as a stand-alone device coupled to the hosts 22a-22c as shown in FIG. 1 or, alternatively, the storage device 24 may be part of a storage area network (SAN) that includes a plurality of other storage devices as well as routers, network connections, etc. The storage device may be coupled to a SAN fabric and/or be part of a SAN fabric. The system described herein may be implemented using software, hardware, and/or a combination of software and hardware where software may be stored in a computer readable storage medium and executed by one or more processors, and a network on which the system may be implemented may include any suitable network, including an intranet or the Internet.

Figure 2:
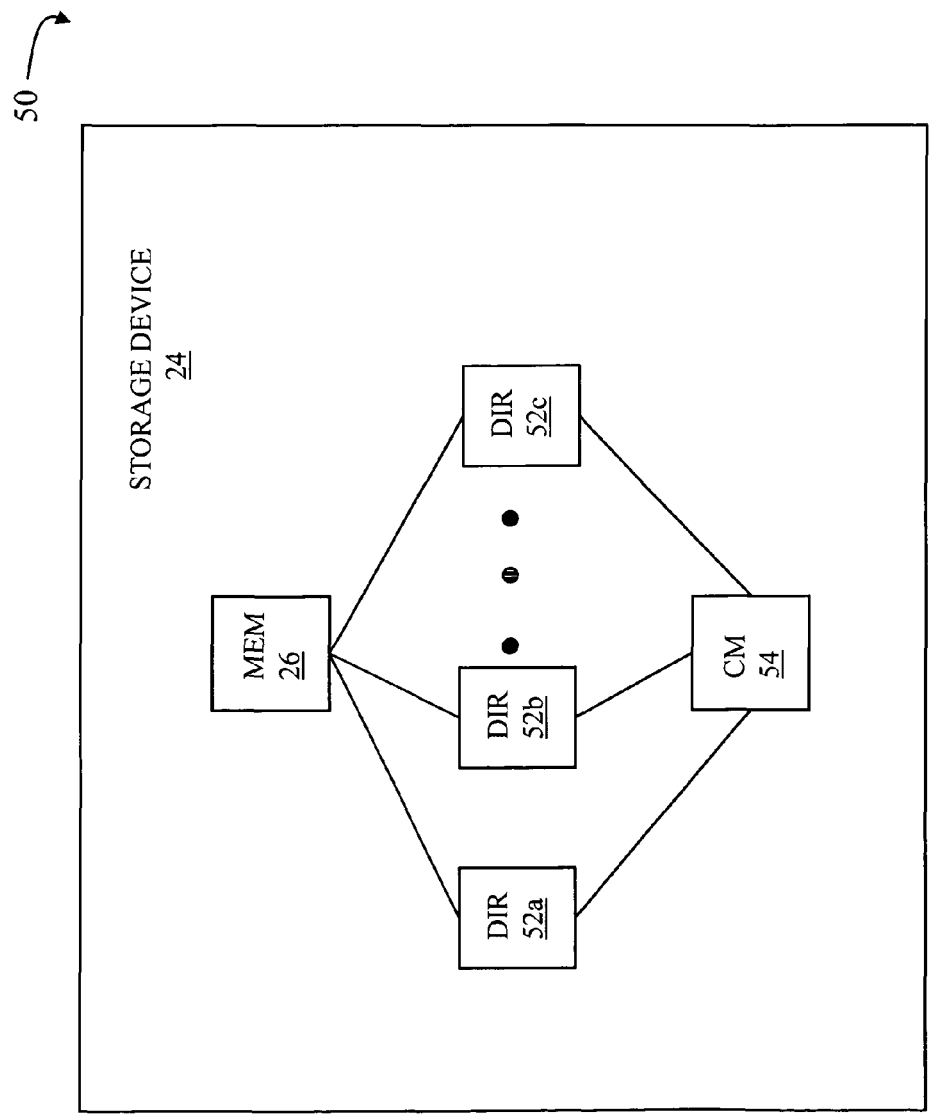
FIG. 2 is a schematic diagram showing a storage device, memory, a plurality of directors, and a communication module that may be used in connection with the system described herein.

FIG. 2 is a schematic diagram 50 illustrating an embodiment of the storage device 24 where each of a plurality of directors 52a-52c are coupled to the memory 26. Each of the directors 52a-52c may represent one of the HA's 28a-28c, RA's 32a-32c, and/or DA's 38a-38c. In an embodiment disclosed herein, there may be up to sixty-four directors coupled to the memory 26. Of course, for other embodiments, there may be a higher or lower maximum number of directors that may be used.

The diagram 50 also shows an optional communication module (CM) 54 that provides an alternative communication path between the directors 52a-52c. Each of the directors 52a-52c may be coupled to the CM 54 so that any one of the directors 52a-52c may send a message and/or data to any other one of the directors 52a-52c without needing to go through the memory 26. The CM 54 may be implemented using conventional MUX/router technology where a sending one of the directors 52a-52c provides an appropriate address to cause a message and/or data to be received by an intended receiving one of the directors 52a-52c. Some or all of the functionality of the CM 54 may be implemented using one or more of the directors 52a-52c so that, for example, the directors 52a-52c may be interconnected directly with the interconnection functionality being provided on each of the directors 52a-52c. In addition, a sending one of the directors 52a-52c may be able to broadcast a message to all of the other directors 52a-52c at the same time.

In some embodiments, one or more of the directors 52a-52c may have multiple processor systems thereon and thus may be able to perform functions for multiple directors. In some instances, at least one of the directors 52a-52c having multiple processor systems thereon may simultaneously perform the functions of at least two different types of directors (e.g., an HA and a DA). Furthermore, in some embodiments, at least one of the directors 52a-52c having multiple processor systems thereon may simultaneously perform the functions of at least one type of director and perform other processing with the other processing system. In addition, the memory 26 may be a global memory in which all or at least part of the global memory may be provided on one or more of the directors 52a-52c and shared with other ones of the directors 52a-52c. The memory 26 may be part of a global memory distributed across the processor systems of more than one storage device and accessible by each of the storage devices.

Note that, although specific storage device configurations are disclosed in connection with FIGS. 1 and 2, it should be understood that the system described herein may be implemented on any appropriate platform. Thus, the system described herein may be implemented using a platform like that described in connection with FIGS. 1 and 2 or may be implemented using a platform that is somewhat or even completely different from any particular platform described herein.

Figure 3:
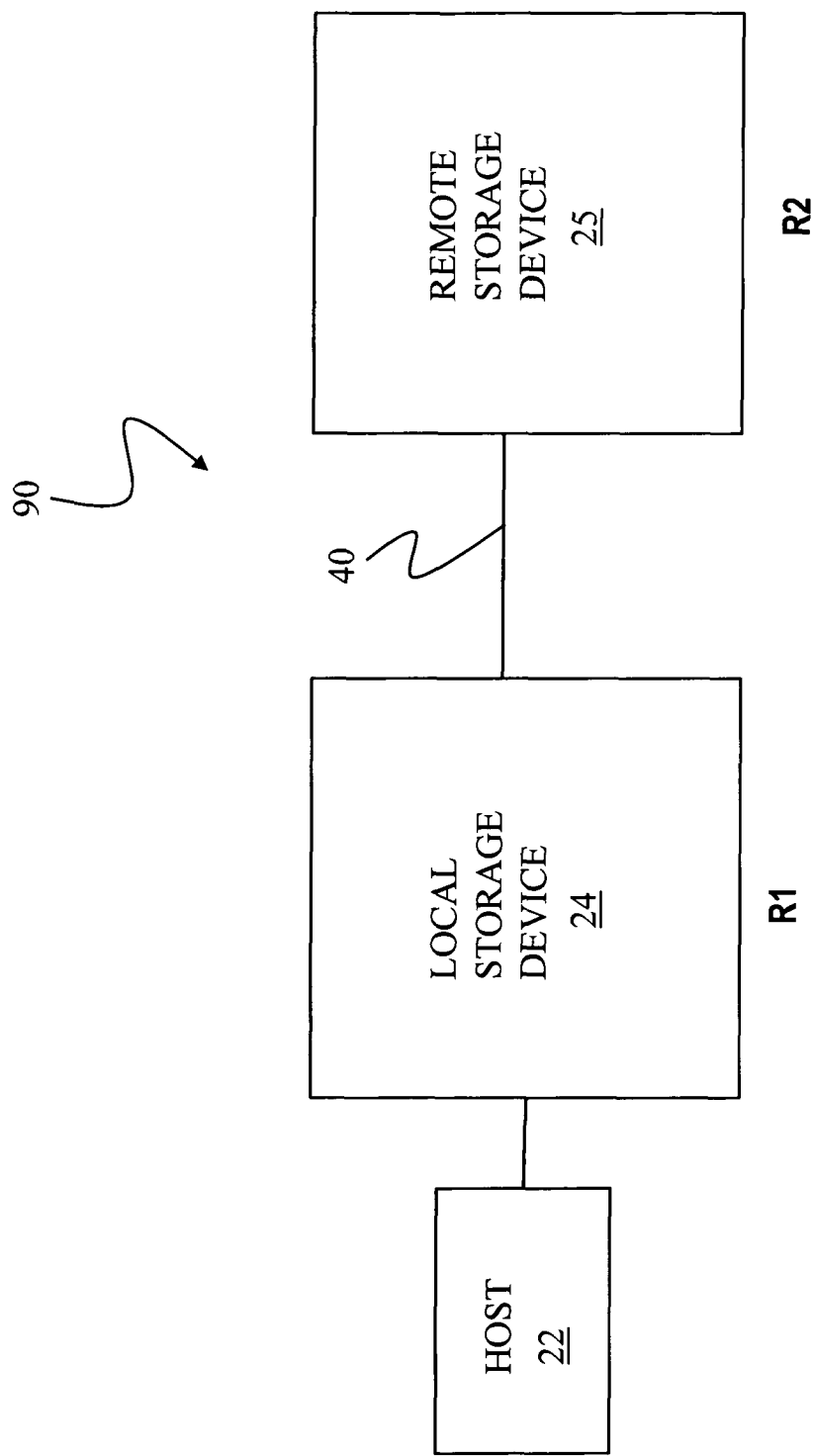
FIG. 3 is a schematic diagram showing a storage system including the storage device, as a local storage device, coupled to a remote storage device via an RDF link that may be used in connection with an embodiment of the system described herein.

FIG. 3 is a schematic diagram showing a storage system 90 including the storage device 24, as a local storage device, coupled to a remote storage device 25 via the RDF link 40. The remote storage device 25 may be the same type of storage device as the storage device 24, and have similar components as described with respect to the storage device 24, and/or may be a different type of storage device. The local storage device 24 and the remote storage device 25 may operate as an RDF product for providing backup and/or mirrored copies of data, as further discussed elsewhere herein. The RDF functionality described herein may be applied so that the data for at least a portion of the disks 36a-36c of the local storage device 24 is copied, using RDF, to at least a portion of similar disks of the remote storage device 25. It is possible that other data of the storage devices 24, 25 is not copied between the storage devices 24, 25 and, thus, the data stored on the storage devices 24, 25 may not be identical.

Providing an RDF mapping between portions of the local storage device 24 and the remote storage device 25 involves setting up a logical device on the remote storage device 25 that is a remote mirror for a logical device on the local storage device 24. One or more of the hosts 22a-22c, illustrated as a host 22, may read and write data from and to the logical device on the local storage device 24 and the RDF mapping causes modified data to be transferred from the local storage device 24 to the remote storage device 25 using the RA's 32a-32c and similar RA's on the remote storage device 25 that are connected via the RDF link 40. In steady state operation, the logical device on the remote storage device 25 may contain data that is a copy of, or at least substantially identical to, the data of the logical device on the local storage device 24. The logical device on the local storage device 24 that is accessed by the host 22 may be referred to as the "R1 volume" (or just "R1") while the logical device on the remote storage device 25 that contains a copy of the data on the R1 volume is called the "R2 volume" (or just "R2"). Thus, the host 22 reads and writes data from and to the R1 volume and RDF handles automatic copying and updating of the data from the R1 volume to the R2 volume and/or from the R2 volume to the R1 volume in accordance with the system described herein In an embodiment, the system described herein may be used in connection with SRDF synchronous (SRDF/S) transfers. For an SRDF/S transfer, data written from one of the hosts 22a-22c to the local storage device 24 may be stored locally, for example on one of the data volumes 36a-36c of the local storage device 24 while being transferred from the local storage device 24 to the remote storage device 25. Receipt by the remote storage device 25 is then acknowledged to the local storage device 24 which then provides an acknowledge of the initial write back to the appropriate one of the hosts 22a-22c. In other embodiments, the system described herein may also be used in connection with, or in combination with, other modes of data transfer including, for example, asynchronous (SRDF/A) transfers and/or other appropriate data transfer systems and devices.

Figure 4:
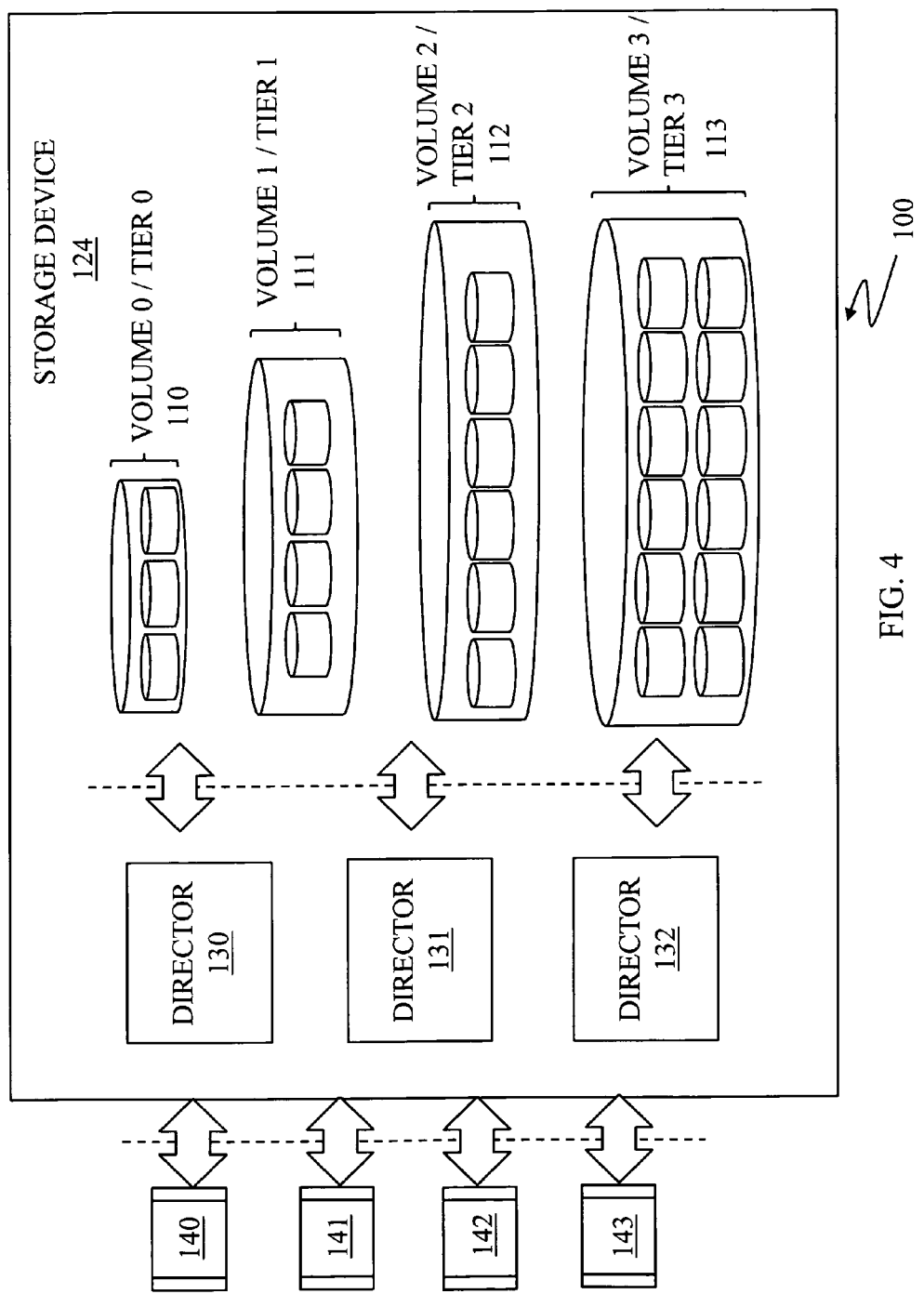
FIG. 4 is a schematic illustration showing a storage system according to an embodiment of the system described herein.

FIG. 4 is a schematic illustration showing a storage system 100 according to an embodiment of the system described herein. The storage system 100 may include a storage device 124 having multiple directors 130-132 and multiple storage volumes (VOLUMES 0-3) 110-113. Host applications 140-144 and/or other entities (e.g., other storage devices, SAN switches, etc.) request data writes and data reads to and from the storage device 124 that are facilitated using one or more of the directors 130-132. The storage device 124 may include similar features as that discussed in connection with the storage device 24 of FIGS. 1-3 with appropriate modifications made in accordance with the functionality discussed elsewhere herein.

The volumes 110-113 may be provided in multiple storage tiers (TIERS 0-3) that may have different storage characteristics, such as speed, cost, reliability, availability, security and/or other characteristics. Various techniques concerning the management of data between volumes on multiple storage tiers and/or between multiple storage tiers within a single volume, including the use of thin provisioning technology, are discussed, for example, in U.S. patent applications: U.S. Ser. No. 11/726,831 to Yochai et al., filed Mar. 23, 2007, entitled "Automated Information Life-Cycle Management With Thin Provisioning" and published on Mar. 12, 2009 as U.S. Patent App. Pub. No. 2009/0070541 A1; U.S. Ser. No. 11/823,156 to Burke et al., filed Jun. 27, 2007, entitled "Fine Grained Tiered Storage With Thin Provisioning;" U.S. Ser. No. 11/823,152 to Burke, filed Jun. 27, 2007, entitled "Storage Management For Fine Grained Tiered Storage With Thin Provisioning;" U.S. Ser. No. 11/903,869 to Veprinsky, filed Sep. 25, 2007, entitled "Data De-Duplication Using Thin Provisioning;" U.S. Ser. No. 12/586,837 to LeCrone et al., filed Sep. 29, 2009, entitled "Sub-Tiering Data At The Volume Level;" and U.S. Ser. No. 12/592,988 to Martin et al., filed Dec. 7, 2009, entitled "Normalizing Capacity Utilization Within Virtual Storage Pools," which are all incorporated herein by reference. Techniques similar to those discussed above may be implemented in one or more Virtual Provisioning products produced by EMC Corporation of Hopkinton, Mass., such as EMC CLARiiON Virtual Provisioning and/or EMC Symmetrix Virtual Provisioning, and may be used in connection with the system described herein.

According to various embodiments, each of the volumes 110-113 may be located in different storage tiers. Tiered storage provides that data may be initially allocated to a particular fast volume/tier, but a portion of the data that has not been used over a period of time may be automatically moved to a slower (and perhaps less expensive) tier. For example, data that is expected to be used frequently, for example database indices, may be initially written directly to fast storage whereas data that is not expected to be accessed frequently, for example backup or archived data, may be initially written to slower storage.

Figure 5:
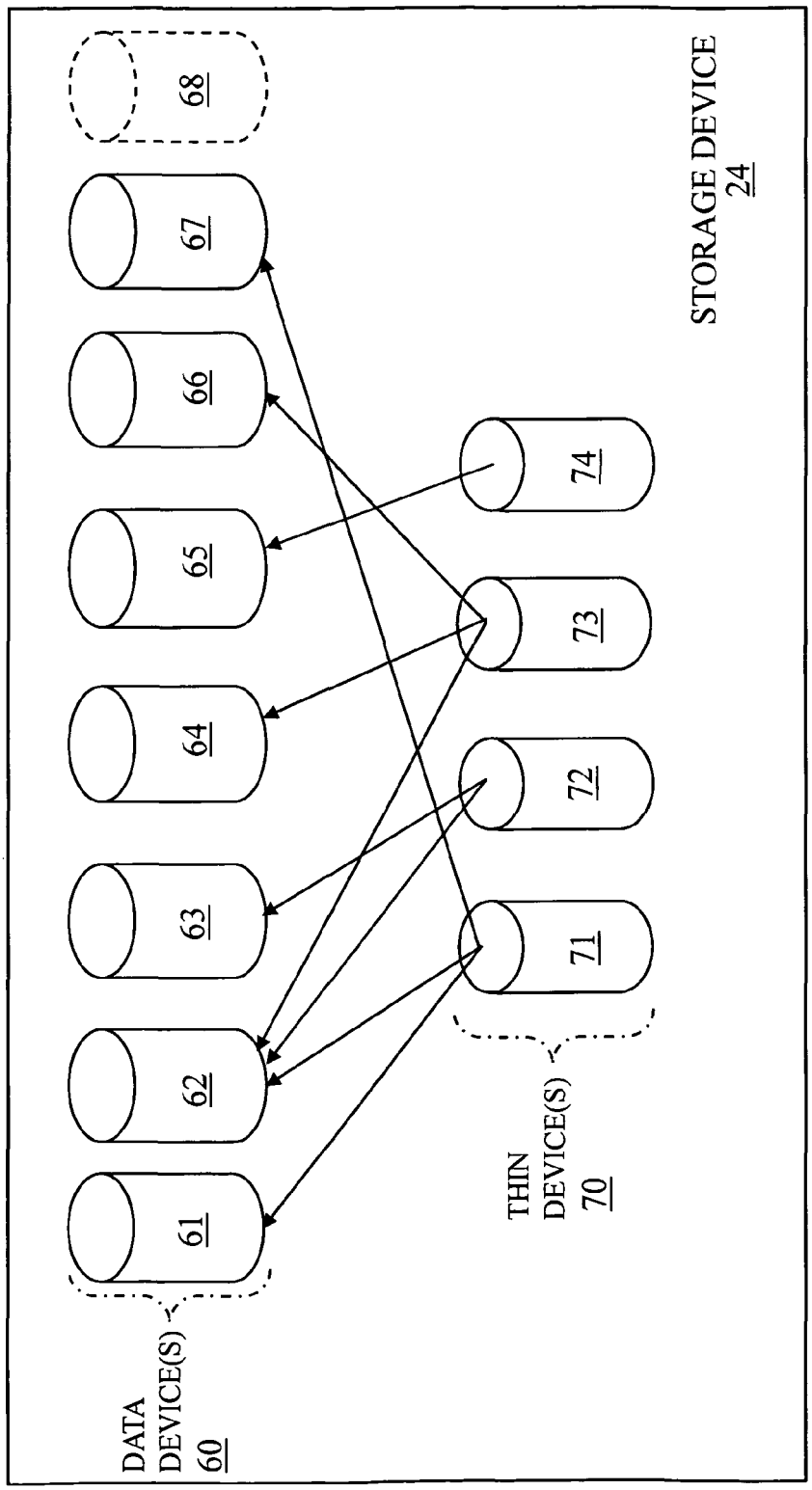
FIG. 5 is a schematic diagram showing the storage device as including one or more data devices and one or more thin devices according to an embodiment of the system described herein.

FIG. 5 is a schematic diagram showing the storage device 24 as including a plurality of data devices 61-68 and a plurality of thin devices 71-74 that may be used in connection with the system described herein. Alternatively, in other embodiments that may be used in connection with the system described herein, instead of being separate devices, the data devices 61-68 may be sections of one data device 60 and, similarly, the thin devices 71-74 may be sections of one thin device 70. Further, the thin devices 71-74, and/or sections of the thin device 70, may be incorporated into the storage device 24 and/or may be stored and accessed externally to the storage device 24. The data devices 61-68 may be implemented as a logical device like standard logical devices provided in a Symmetrix data storage device produced by EMC Corporation of Hopkinton, Mass. The data device section 68 is illustrated with broken lines to indicate that the data device section 68 does not yet exist but may be created, as further discussed elsewhere herein. In some embodiments, the data device sections 61-67 may not be directly useable (visible) to hosts coupled to the storage device 24. Each of the data devices sections 61-67 may correspond to a portion (including a whole portion) of one or more of the disk drives 42-44. Thus, for example, the data device section 61 may correspond to the disk drive 42, may correspond to a portion of the disk drive 42, or may correspond to a portion of the disk drive 42 and a portion of the disk drive 43. The data devices sections 61-67 may be designated as corresponding to different classes, so that different ones of the data devices 61-67 correspond to different physical storage having different relative access speeds or RAID (redundant array of independent disks) protection type or some other relevant distinguishing characteristic or combination of characteristics.

The thin devices 71-74 may appear to a host coupled to the storage device 24 as a logical volume (logical device) containing a contiguous block of data storage. Each of the thin devices 71-74 may contain pointers to some or all of the data devices 61-67 (or portions thereof), as further discussed elsewhere herein. As illustrated, in some embodiments, only one thin device may be associated with a data device while, in other embodiments, multiple thin devices may be associated with the same data devices. In some instances, an implementation according to the system described herein may allow for hybrid logical devices where a single logical volume has portions that behave as a data device and/or portions that behave as a thin device.

A thin device presents a logical storage space to one or more applications running on a host where different portions of the logical storage space may or may not have corresponding allocated physical storage space associated therewith. However, the thin device may not be mapped directly to physical storage space. Instead, for example, portions of the thin storage device for which physical storage space exists may be mapped to one or more data devices, which are logical devices that map logical storage space of the data device to physical storage space on the disk drives 36a-36c. As further discussed elsewhere herein, an access of the logical storage space of the thin device may result in either a null pointer (or equivalent) indicating that no corresponding physical storage space has yet been allocated, or results in a reference to a data device (or section thereof) which in turn references the underlying physical storage space.

Figure 6:
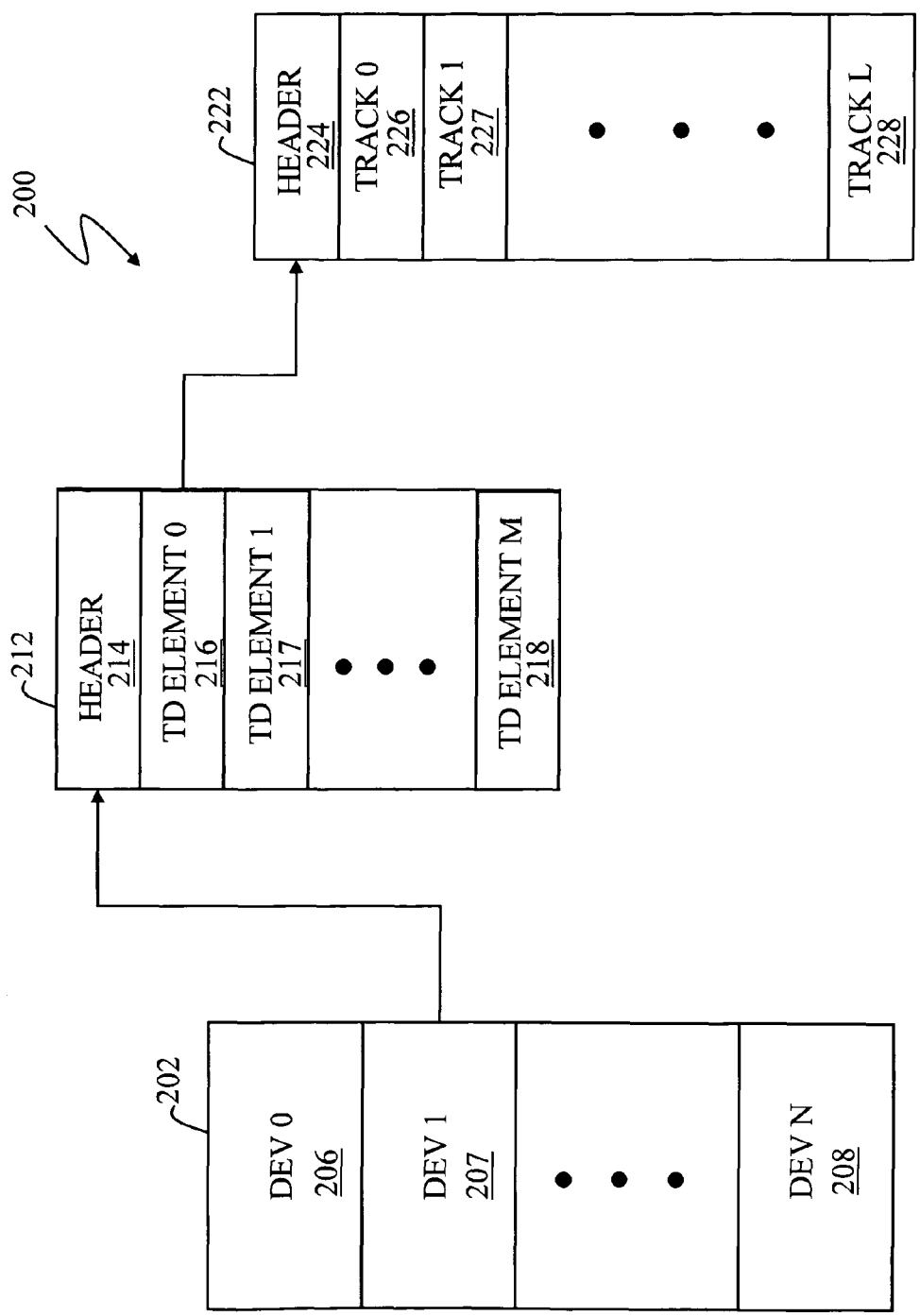
FIG. 6 is a schematic diagram illustrating tables that are used to keep track of device information according to an embodiment of the system described herein.

FIG. 6 is a diagram 200 illustrating tables that are used to keep track of device information according to an embodiment of the system described herein. A first table 202 corresponds to all of the devices used by a storage device or by an element of a storage device, such as an HA and/or a DA. The table 202 includes a plurality of logical device (logical volume) entries 206-208 that correspond to all the logical devices used by the storage device (or portion of the storage device). The entries in the table 202 may include information for thin devices, for data devices, for standard logical devices, for virtual devices, for business continuance volume (BCV) devices, and/or any or all other types of logical devices used in connection with the system described herein.

Each of the entries 206-208 of the table 202 correspond to another table that may contain information for one or more sections of a logical volume, such as a thin device logical volume. For example, the entry 207 may correspond to a thin device table 212. The thin device table 212 may include a header 214 that contains overhead information, such as information identifying the corresponding thin device, information concerning the last used data device and/or other information including counter information, such as a counter that keeps track of used group entries (described below). The header information, or portions thereof, may be available globally to the storage device 24.

The thin device table 212 may include one or more group elements 216-218, that contain information corresponding to a group of tracks on the data device. A group of tracks may include one or more tracks, the number of which may be configured as appropriate. In an embodiment herein, each group has twelve tracks, although this number may be configurable or dynamically adjustable based on criteria described elsewhere herein.

One of the group elements 216-218 (for example, the group element 216) of the thin device table 212 may identify a particular one of the data devices 61-67 having a track table 222 that contains further information, such as a header 224 having overhead information and a plurality of entries 226-228 corresponding to each of the tracks of the particular one of the data device sections 61-67. The information in each of the entries 226-228 may include a pointer (either direct or indirect) to the physical address on one of the disk drives 36a-36c of the storage device 24 (or a remote storage device 25 if the system is so configured) that maps to the logical address(es) of the particular one of the data devices 61-67. Thus, the track table 222 may be used in connection with mapping logical addresses of the logical device sections corresponding to the tables 202, 212, 222 to physical addresses on the disk drives 36a-36c of the storage device 24.

The tables 202, 212, 222 may be stored in the global memory 26 of the storage device 24. In addition, the tables corresponding to particular logical device sections accessed by a particular host may be stored (cached) in local memory of the corresponding one of the HA's 28a-28c. In addition, the RA's 32a-32c and/or the DA's 38a-38c may also use and locally store (cache) portions of the tables 202, 212, 222.

Figure 7:
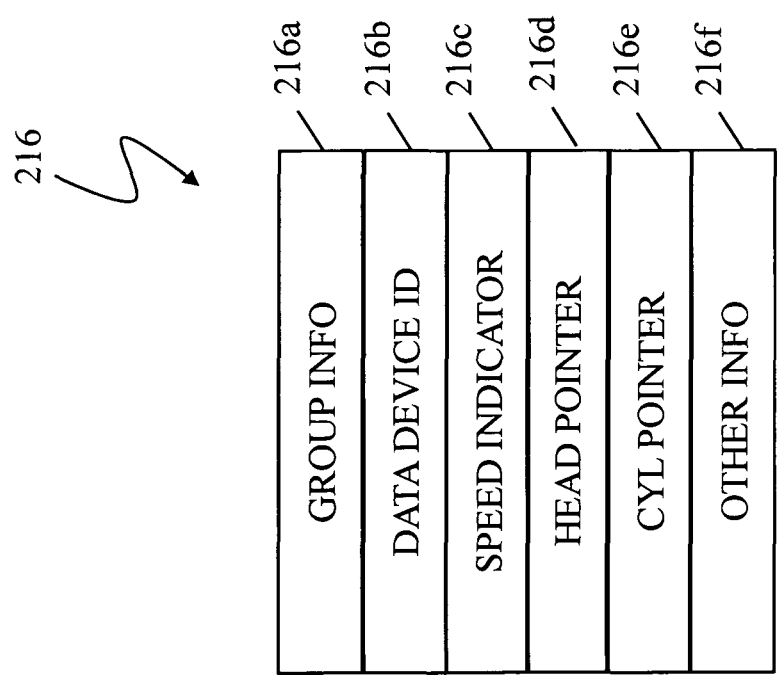
FIG. 7 is a schematic diagram illustrating a group element of the thin device table in connection with an embodiment of the system described herein.

FIG. 7 is a schematic diagram illustrating a group element 216 of the thin device table 212 in connection with an embodiment of the system described herein. The group element 216 may includes a plurality of entries 216a-216f. The entry 216a may provide group information, such as a group type that indicates whether there has been physical address space allocated for the group. The entry 216b may include information identifying one (or more) of the data devices 61-67 that correspond to the group (i.e., the one of the data devices 61-67 that contain pointers for physical data for the group). The entry 216c may include other identifying information for the one of the data devices 61-67, including a speed indicator that identifies, for example, if the data device is associated with a relatively fast access physical storage (disk drive) or a relatively slow access physical storage (disk drive). Other types of designations of data device sections are possible (e.g., relatively expensive or inexpensive, RAID protection type, number of mirrored copies, etc.). The entry 216d may be a pointer to a head of the first allocated track for the one of the data devices 61-67 indicated by the ID entry 216b. Alternatively, the entry 216d may point to header information of the data device track table 222 immediately prior to the first allocated track. The entry 216e may identify a cylinder of a first allocated track for the one the data devices 61-67 indicated by the ID entry 216b. The entry 216f may contain other information corresponding to the group element 216 and/or the corresponding thin device. In other embodiments, entries of the group table 216 may identify a range of cylinders of the thin device and a corresponding mapping to map cylinder/track identifiers for the thin device to tracks/cylinders of a corresponding data device. In an embodiment, the size of the group element 216 may be eight bytes.

Figure 8:
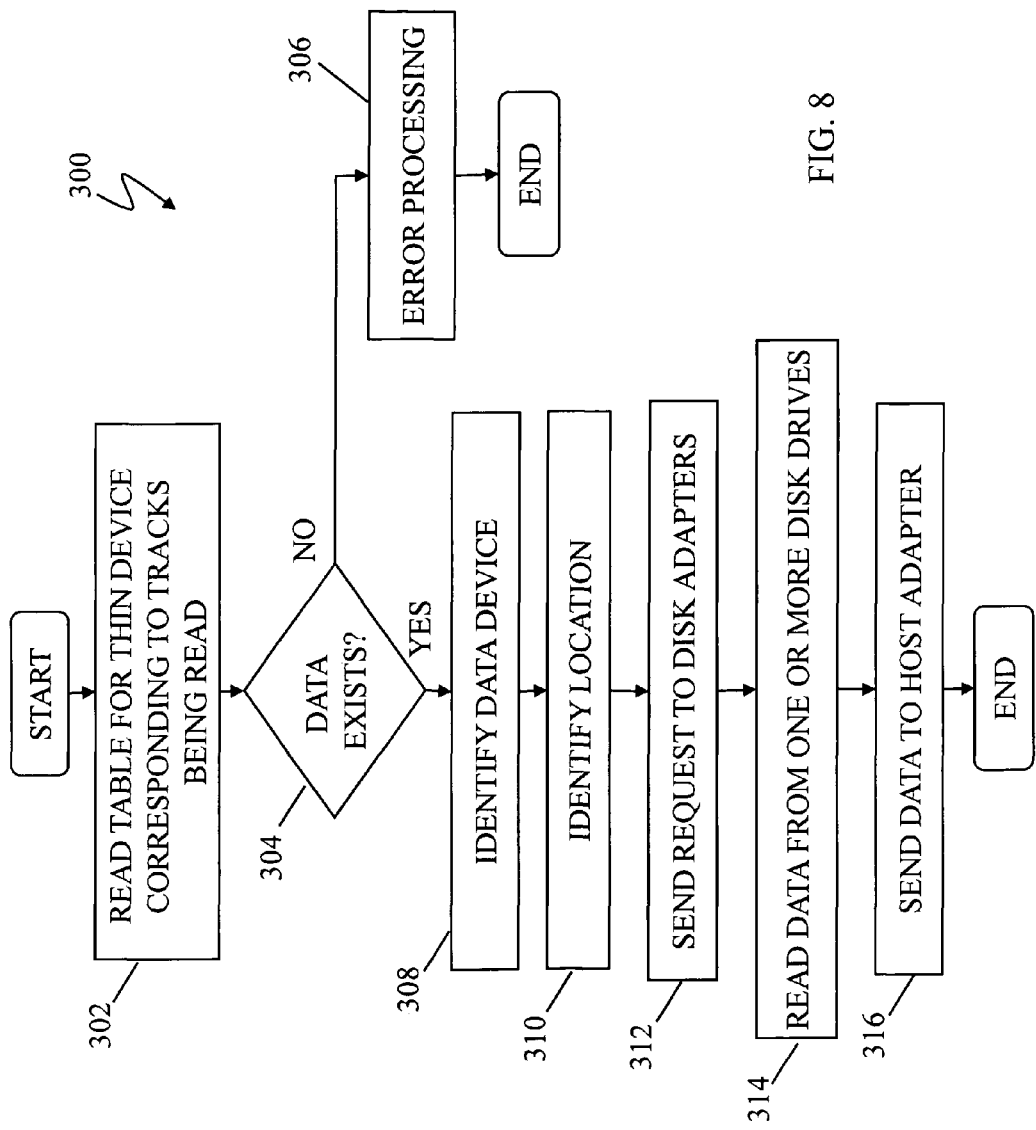
FIG. 8 is a flow diagram illustrating processing for handling a read of one or more logical tracks of one of the thin devices according to an embodiment of the system described herein.

FIG. 8 is a flow diagram 300 illustrating processing for handling a read of one or more logical tracks of one of the thin devices 71-74 in an embodiment of the system described herein. In a step 302, an appropriate one of the host adapters 28a-28c reads the group table 212 of the one of the thin devices 71-74 corresponding to the logical tracks being read. After the step 302, at a test step 304, it is determined whether the logical tracks identified from the group table 212 corresponds to any of the data devices 61-67 (i.e., if there is physical data corresponding to the logical tracks being read). If there is no corresponding physical data (meaning that no logical track(s) were ever written), then processing proceeds to a step 306 where error processing is performed, such as returning a NULL value to the host. Other appropriate error processing may be performed at the step 306. After the step 306, processing is complete.

If it is determined at the step 304 that there is physical data corresponding to the logical tracks being read, then processing proceeds to a step 308 where one or more of the data devices 61-67 associated with the logical tracks being read are identified from the group table 212. After the step 308, processing proceeds to a step 310 where the track table 222 is read from the identified one or more of the data devices 61-67 and the corresponding location of the physical data (i.e., cylinder and track) is determined. Logical storage space maps to physical storage space of the physical devices. After the step 310, processing proceeds to a step 312 where a request may be sent to one or more disk adapters 38a-38c corresponding to disk drives 36a-36c that provide the physical storage space associated with the identified one of the data devices 61-67 and corresponding location information. After the step 312, processing proceeds to a step 314 where the physical data is read. Note that the data may be stored in a cache or other memory (for example, the memory 26) in connection with being read. In some cases, if the data being read is already in the cache, then the processing at the step 812 and following steps may not be necessary. Note also that reading the data may include updating any metadata used to provide the processing described herein, such as the time last accessed, the host/user making the request, frequency of use, and/or any other appropriate metric. After the step 314, processing proceeds to a step 316 where the data may be received by an appropriate one of the host adapters 28a-28c (e.g., by reading the memory 26). After the step 316, processing is complete.

Figure 9:
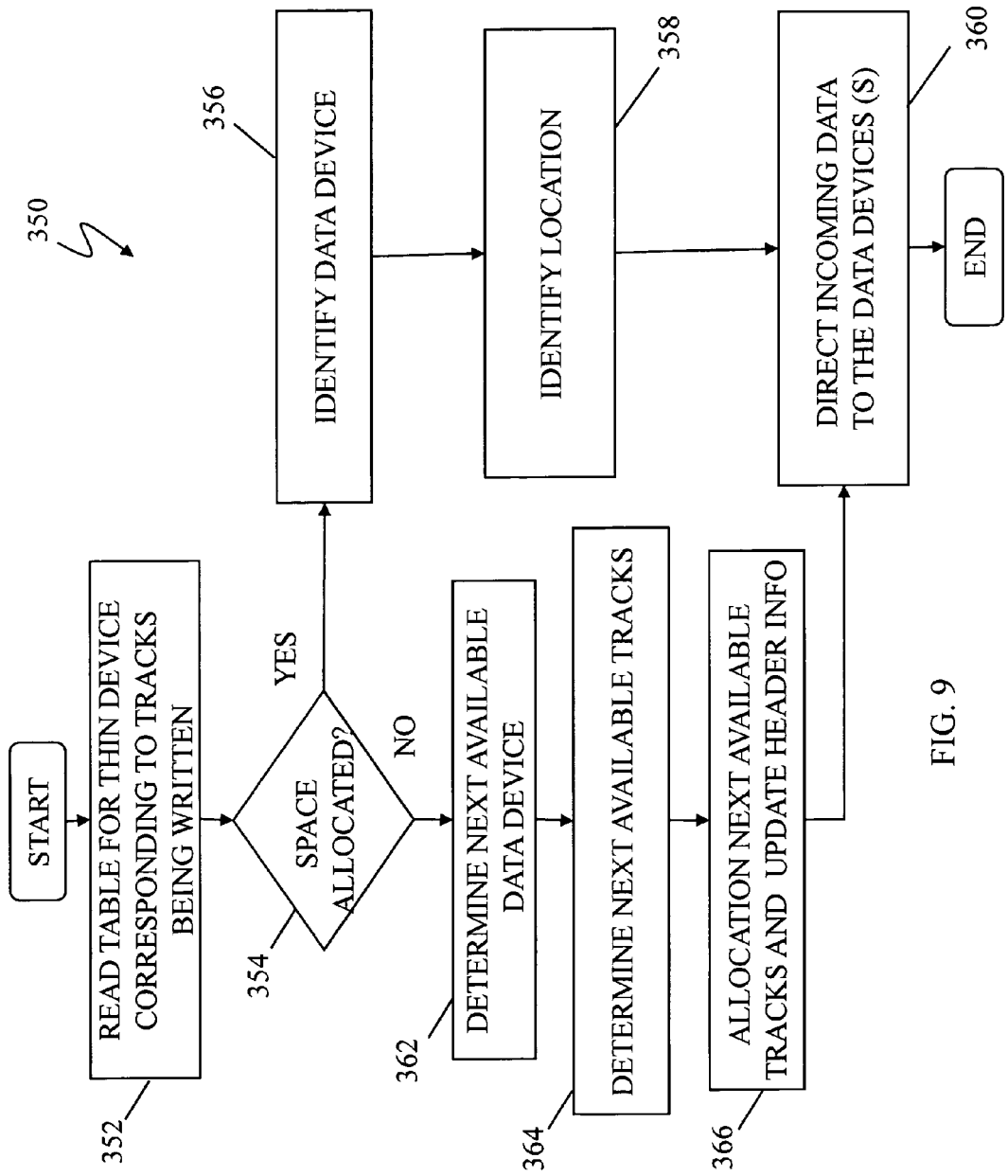
FIG. 9 is a flow diagram illustrating processing for handling a write of logical track(s) to one or more of the thin devices in connection with the system described herein.

FIG. 9 is a flow diagram 350 illustrating processing for handling a write of logical track(s) to one or more of the thin device(s) 71-74 in connection with the system described herein. At a step 352, an appropriate one of the host adapters 28a-28c reads the group table 212 of the one or more of the thin devices 71-74 corresponding to the logical tracks being written.

Following the step 352 is a test step 354 where it is determined whether physical space had been previously allocated (i.e., in a prior write operation) for the tracks being written. If so, then processing proceeds to a step 356 where the data device that includes the tracks is identified. After the step 356, is a step 358 where the track table 222 is read from the identified one or more of the data devices 61-67 and the corresponding location of the physical data (i.e., cylinder and track) is determined. As further discussed elsewhere herein, physical storage space may be provided in connection with one data device including a concatenation of multiple data device portions. Storage space of the physical devices maps to logical storage space of the data devices. Following the step 358 processing proceeds to a step 360 where the data being written is directed to the appropriate physical storage space. As further discussed elsewhere herein, data may be written among multiple devices in a striping process in which data is advantageously striped across the multiple devices. After the step 360, processing is complete.

If it is determined at the step 354 that there is no physical storage that has been allocated for the logical track(s) being written, then control transfers to a step 362, where a next available data device identifier (i.e., the data device 68) is determined. This information may be obtained from the header 214 of the device table 212.

After the step 362, processing proceeds to a step 364 where available physical storage space on the disk drives 36a-36c is determined. In an embodiment herein, available physical storage space is allocated sequentially from one or more of the disk drives 36a-36c. Following the step 364 is a step 366 where a request may be sent to a disk adapter 38a-38c (or possibly the RA's 32a-32c) to allocate the physical storage space for the write. Also at the step 366, header info is updated to reflect the newly allocated data device and physical tracks. After the step 366, processing proceeds to the step 360, discussed above, where the data being written is directed to the one or more data device sections. After the step 360, processing is complete.

After the above-described read and write processes, information concerning access of the data, such as access frequency, time of last access or use and/or other characteristics and statistics, may be updated and stored by the system described herein. The updated data access information or other characteristic information of the data and/or any portion of the data may, for example, be stored as an entry in a group element of the thin device table 212 (for example, the entry 216f of the group element 216). Alternatively, the data characteristic information may be stored in a memory, such as the global memory 26 of the storage device 24, and a pointer to this information stored in the group element 216. Other implementations for storing and access of the data characteristic information are possible.

The allocation of the physical storage space for a thin device at the time of writing the data, as well as the policies that govern the allocation, may be transparent to a user. For example, a user's inquiry into how much storage space is available on a particular thin device may indicate a maximum amount of physical storage space that could be made available for a thin storage device even though the corresponding physical storage space had not yet been allocated. In an alternative embodiment, the policy for the thin device may be to report something less than the total maximum that could be allocated. In some embodiments, used (unavailable) physical storage space may not exceed a predetermined level, e.g. 30%, of the thinly-provisioned storage capacity that appears available to the user. Other methods and features involving reservation and allocation of space are further discussed elsewhere herein.

As discussed elsewhere herein, the data devices 61-68 may be associated with physical storage areas (e.g., disk drives, tape, solid state storage, etc.) having different characteristics. In various embodiments, the physical storage areas may include multiple sub-tiers of storage in which each sub-tier of storage areas and/or disk drives that may be ordered according to different characteristics and/or classes, such as speed, technology and/or cost. The thin devices 71-74 may appear to a host coupled to the storage device 24 (and/or, e.g., the storage device 124) as a logical volume (logical device) containing a contiguous block of data storage, as discussed herein. Each of the thin devices 71-74 may correspond to a particular data device, a portion thereof and/or multiple data devices. Accordingly, each of the thin devices 71-74 may map to storage areas across multiple storage volumes. As a result, although each of the thin devices 71-74 may appear as containing a logically contiguous block of storage, each of the thin devices 71-74 may allow for blocks of data to be transparently stored (and/or retrieved) from discontiguous storage pools made up of the varying classes of storage. In this way, the granularity at which the storage system described herein operates may be smaller than at the file level, for example potentially as small as a single byte, but more practically at the granularity of a single logical block or collection of sequential data blocks. A data block may be of any size including file system or database logical block size, physical block, track or cylinder and/or other size. Multiple data blocks may be substantially the same size or different sizes, such as different size data blocks for different storage volumes or different sized data blocks within a single storage volume. It is also noted that, in other embodiments, the thin device 70 may be a metavolume of concatenated thin volumes/devices, as further discussed elsewhere herein.

Figure 10:
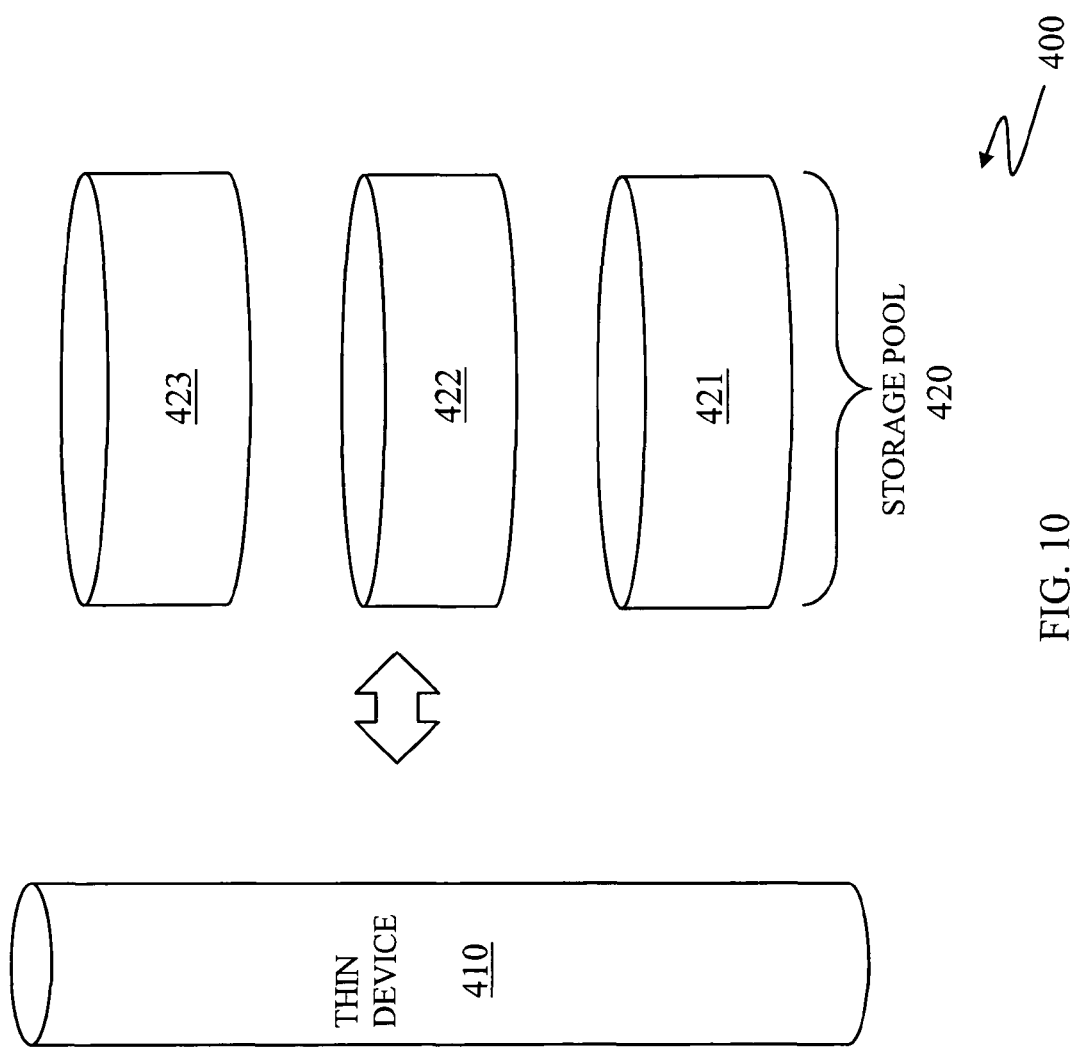
FIG. 10 is a schematic illustration of a storage system including thin provisioning features according to an embodiment of the system described herein.

FIG. 10 is a schematic illustration of a storage system 400 including thin provisioning features according to an embodiment of the system described herein. A thin device 410, that may be like the thin devices 71-74 discussed elsewhere herein, is shown coupled to multiple storage volumes 421-423 forming a storage pool 420 accessible to the thin device 410. As discussed elsewhere herein, each of the volumes 421-423 may include one or more data devices, like the data devices 61-68 discussed elsewhere herein, that map to physical storage areas. The volumes 421-423 may be part of one or more storage devices like that further discussed elsewhere herein.

The thin device 410 may map to the different storage volumes 421-423 although, as noted above, the mapping may not be a direct mapping to physical storage space. A particular thin device may indicate a maximum amount of physical storage space that could be allocated for the thin device (thin-provisioned storage space) even though the corresponding physical storage space has not yet been allocated. As discussed herein, the granularity of the system described herein may be less than at the file level and allow for blocks of data of any size to be stored across multiple storage volumes 421-423 in a process that is transparent to the host and/or host application.

Figure 11:
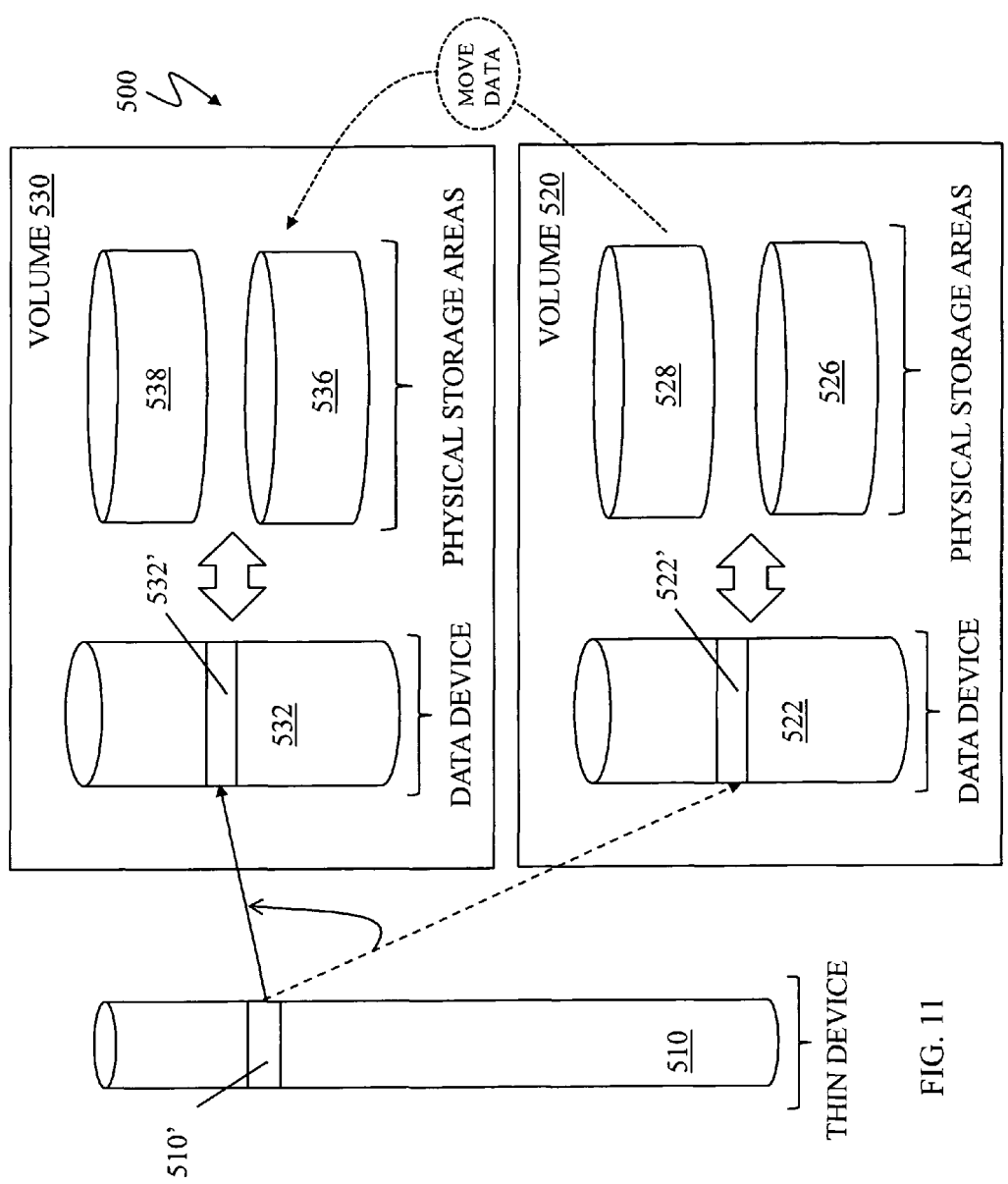
FIG. 11 is a schematic illustration showing a storage device in connection with movement of data using thin provisioning according to an embodiment of the system described herein.

FIG. 11 is a schematic illustration showing an embodiment of a storage system 500 described in connection with movement of data from one storage area to a different storage area involving thin provisioning features according to an embodiment of the system described herein. The storage system 500 may include a thin device 510 and one or more volumes 520, 530. Each of the volumes 520, 530 may include a data device 522, 532 associated with respective physical storage areas 526, 528, 536, 538. Note that, in various embodiments, the thin device 510 may be incorporated into one or more of the volumes 520, 530 and/or be a device that is stored and/or accessed separately therefrom.

According to an embodiment of the system described herein, a portion 510' of the thin device 510 may point to a portion 522' of the data device 522 in connection with a mapping of data stored on the storage volume 520 to one of the physical storage areas 526, 528 of the volume 520. In an embodiment, in connection with moving data from the volume 520 to the volume 530, the pointer from the thin device portion 510' may be modified to point to a new portion 532' of a data device 532 that maps to the new location of the data on the physical storage areas 536, 538 of the volume 530. Data may be moved among volumes of one or more storage pools to normalize utilization of the storage volumes for purposes of appropriately striping data across volumes of the storage pool following the addition of new (empty) volumes to a storage system. It is also noted that in various embodiments, the system described herein may also be appropriately used in connection with "sparse cloning" that allows for more than one thin device to point to a data device as way of providing an efficient cloning mechanism. In this way, cloning operations may be almost instantaneous, involving just the setting of pointers, and initially consume little or no additional physical storage space.

Figure 12:
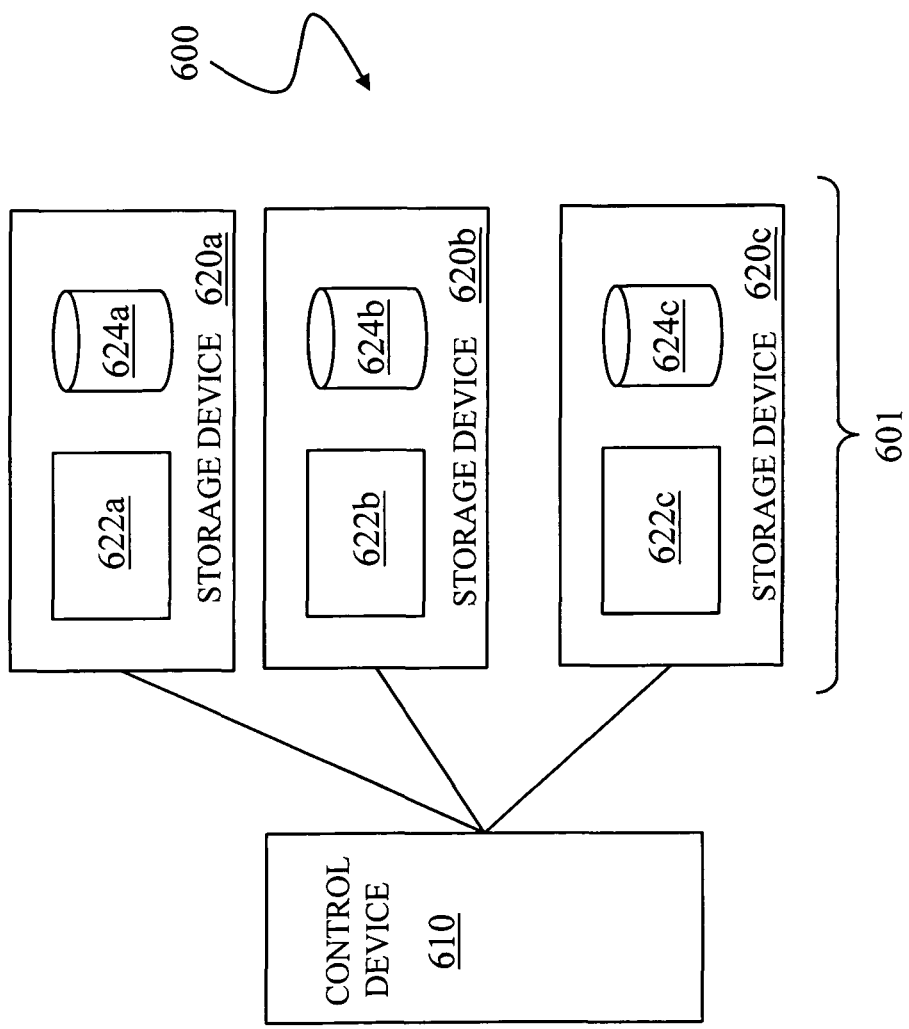
FIG. 12 is a schematic illustration of a storage system that may be used in connection with an embodiment of the system described herein.

FIG. 12 is a schematic illustration of a storage system 600 that may be used in connection with an embodiment of the system described herein. For example, the storage system 600 may be a RAID system. The storage system 600 is shown coupled to storage devices 620a-c, that may each include at least one director 622a-c coupled to at least one volume 624a-c, like that further discussed elsewhere herein, and that together form a storage pool 601. A control device 610 may be provided that is in communication with storage devices 620a-c. The control device 610 may include one or more thin devices, like the thin devices 71-74, and may include other components used in connection with functions of the system described herein.

It is noted that in various embodiments of RAID systems, one or more of the storage devices 620a-c may be a parity device that is used in connection with error correction capability of the RAID system including the use of parity information that is stored on the parity device. Alternatively, it is also noted that parity information may be stored across the storage devices 620a-c rather than being stored in one parity device. Furthermore, in various embodiments, operations involving communication between the storage devices 620a-c of the RAID system may provide mirrored copies of the data blocks replicated across the multiple storage devices and/or operations with portions of the data blocks that are distributed across the multiple storage devices (i.e. striping). Although illustrated with discrete storage devices, in various embodiments, the storage system 600 may include any number of different configurations of disks, disk drives or other storage media coupled to one or more interconnected directors, and it should be noted that other configurations and types of systems involving multiple, redundant storage may be used in connection with the system described herein.

In an embodiment, the system described herein provides methods, features and/or techniques for guaranteeing sufficient space allocation for thin devices. A mechanism may be implemented that guarantees space availability for thin devices, including user-defined critical thinly provisioned devices, without committing, or fully pre-allocating, the space to specific thin device ranges. According to the system described herein, space may be held in reserve for a particular set of thin devices and consumed as needed by those thin devices. The system guards user-critical devices from running out of space, for example due to a "rogue device" scenario in which one device allocates an excessive amount of space, but without actually fully pre-allocating the guaranteed space to the thin devices.

According to an embodiment of the system described herein, a method is provided to reserve track groups of data devices to exclude them from a regular allocation process and keep them in a reserved list for allocation by particular thin devices upon a special request. It should be noted that although track groups are principally discussed herein, the system described herein may also be applied to other appropriate segments and/or designations of data storage. Furthermore, although thin devices are principally discussed herein as subscribing devices of the system described herein, other appropriate types of devices may also be used in connection with the system described herein. As further discussed elsewhere herein, a reserved list of a data device (device reserved list) may include unallocated track groups of the data device that may be extracted from a free list, the free list being a listing of track groups of a data device that are available for use. The device reserved list may provide a base for the track group reservation processing for the data device according to the system described herein.

Figure 13:
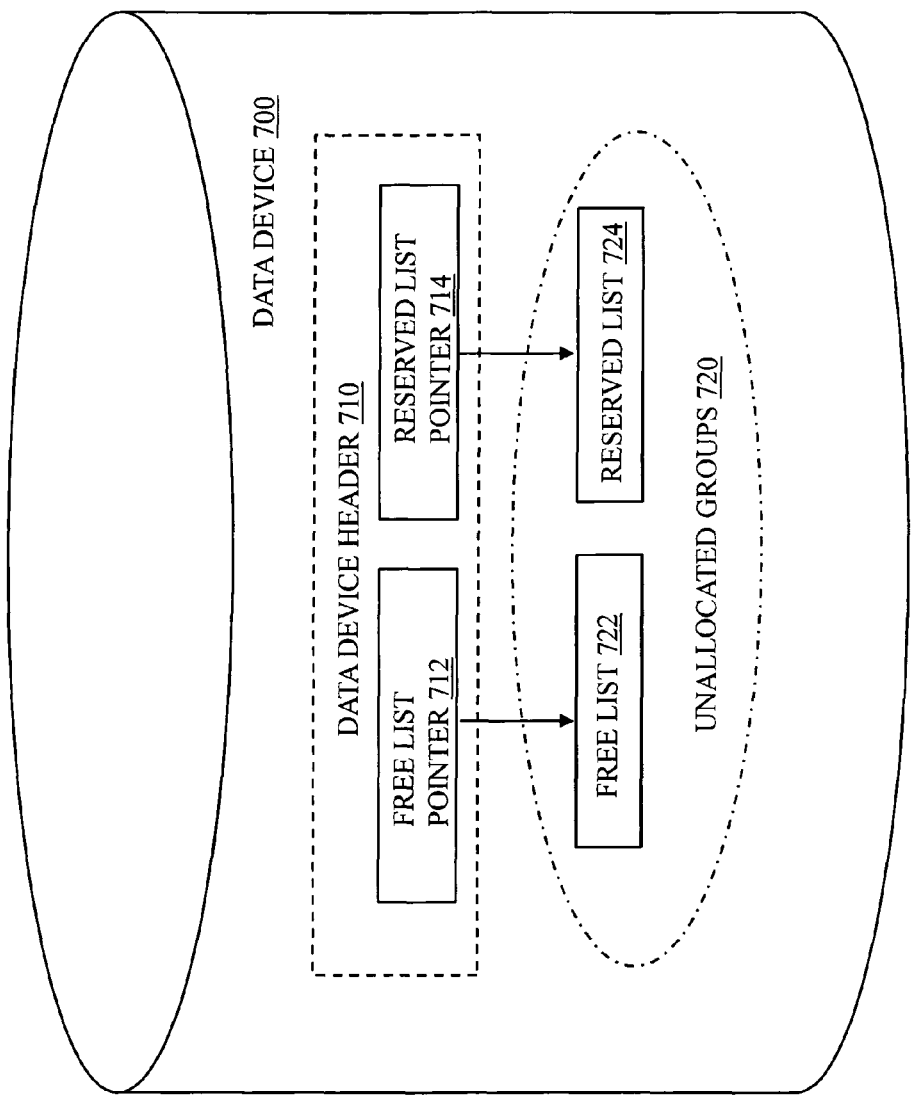
FIG. 13 is a schematic illustration of a data device including a device reserved list according to an embodiment of the system described herein.

FIG. 13 is a schematic illustration of a data device 700 including a device reserved list 724 according to an embodiment of the system described herein. The data device 700 may include a header 710, for example as part of the table 222 discussed elsewhere herein, and an indication of unallocated track groups 720 on the data device 700. It is noted that the allocated track groups and the identification thereof may also be contained on the data device 700, although not shown in FIG. 13. In connection with the unallocated track groups 720, the data device 700 may include a free list 722 identifying available track groups and a device reserved list 724 identifying reserved groups according to the system described herein. Tracks groups on the device reserved list 724 may be extracted from the free list 722. In an embodiment, the header 710 may include one or more pointers, including a pointer 712 to the free list 722 and/or a pointer 714 to the device reserved list 724. As further discussed elsewhere herein, a special list infrastructure for scanning both the free list 722 and the device reserved list 724 may be used in connection with the system described herein. The device reserved list 724 may be created from unallocated groups of the free list 722 of the same data device 700. In an embodiment, the data device 700 may include only one device reserved list 724. It is further noted that although the free list 722 and the device reserved list 724 are shown within the data device 700, in other embodiments, the lists 722, 724 may be stored elsewhere and appropriately accessed according to the system described herein.

In an embodiment, the device reserved list 724 may include a generic double-linked (GPDV) list infrastructure that may be created to provide all the operations/manipulations related to the GPDV list. The GPDV infrastructure may include an application programming interface (API) and related procedure/functions. Both the free list 722 and the device reserved list 724 may utilize the same low level operational module provided by the GPDV infrastructure. As a double-linked list, the GPDV list may include forward and backward scan options. An information structure corresponding to the device reserved list 724 may be added to the data device header and include: a pointer (GPDV) to the first track group in the list, a track groups counter and/or a track groups limit. In an embodiment, the information structure may be cleared during volume table of contents (VTOC) processing after creation of the free list. Initialization of the device reserved list 724 may be performed upon a request that may include a valid reserved track groups' limit. The pointer to the first track group may be invalidated during initialization, defining an empty list, and the track groups counter may be set to zero. The API of the device reserved list 724 may include functions for the list initialization, creation, deletion, adding/freeing of track groups and also reading, writing, and displaying of the device reserved list information.

To consume space from the device reserved list 724, a subscription mechanism may be used according to an embodiment of the system described herein. A thin device may reserve space from a thin storage pool, and each thin device that requires a space reservation may subscribe to a reservation entity, such as a container or list, according to a subscription and/or other type of space reservation request. Various embodiments of the type of reservation entity to which a thin device may subscribe are further discussed elsewhere herein. Subscription information of the thin device may be added to the thin device header, for example as part of the thin device table 212 discussed elsewhere herein. The subscription information may include a reservation entity ID, a reservation entity type, a subscribed reserved track groups counter, a user reserved track groups counter and/or other appropriate subscription information. A subscription request from a thin device may include a number of track groups that the thin device needs reserved.

In an embodiment, the reservation entity subscribed to by the thin device may include a pool reservation container. The pool reservation container may contain a value that represents a number of reserved groups that may be consumed by any thin device subscribed to that pool reservation container. Reserved groups may be consumed from one or more (or all) of device reserved lists in a given pool. The reserved groups may be consumed according to a policy, such as a round-robin policy and/or other appropriate policy. It is noted that multiple pool reservations containers may exist for each pool. The total number of reserved track groups, defined by all pool reservation containers for a given pool, may not exceed the total reserved capacity of the pool, as defined by the total number of reserved groups in all the devices reserved lists in the pool. In an embodiment, it may be noted that the pool reservation container may not actually contain any specific reserved track groups, but rather may indicate a present reserved capacity which may be drawn upon. Accordingly, reservation of track groups by a thin device using the pool reservation container may correspond to a particular percentage of reserved track groups (e.g., 5%, 10% etc.) that are reserved for each subscribing thin device.

Figure 14:
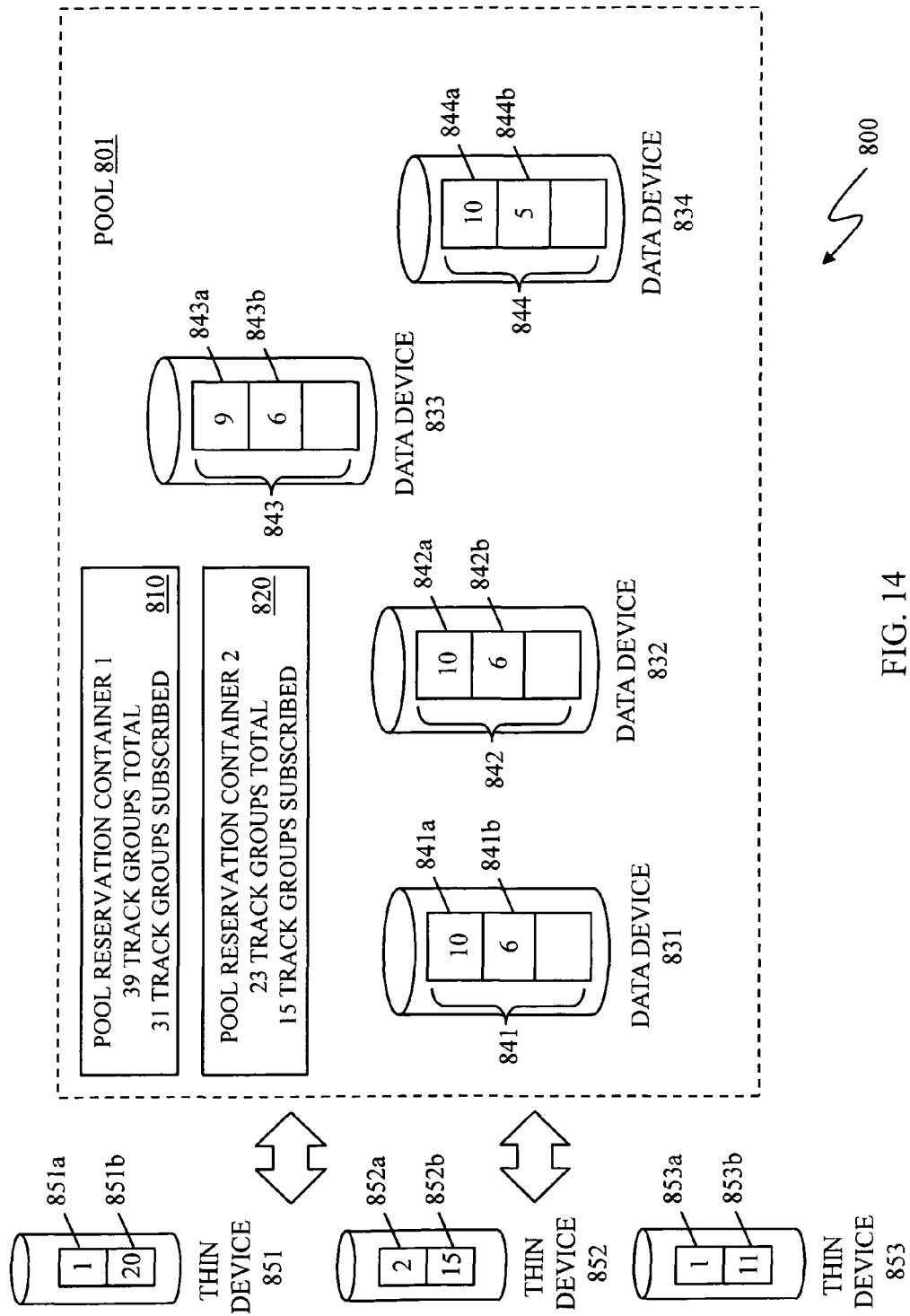
FIG. 14 is a schematic illustration showing a pool including pool reservation containers according to an embodiment of the system described herein.

FIG. 14 is a schematic illustration 800 showing a pool 801 including pool reservation containers 810, 820 according to an embodiment of the system described herein. Although two pool reservation containers are shown corresponding to the pool 801, the system described herein may be used with fewer or more reservation containers for the pool 801. It is also noted that although the pool reservation containers 810, 820 are shown within the pool 801 (i.e. in a data structure thereof), the pool reservation containers 810, 820 may also be stored elsewhere in a separate data structure and appropriately referenced and accessed by the pool 801 according to the system described herein. Each pool reservation container may include: a pool reservation container ID, a total reserved track groups counter and/or a user (subscribed) reserved track groups counter. The pool 801 may include one or more data devices, shown as four data devices 831, 832, 833, 834. The data devices 831-834 may include device reservation lists 841, 842, 843, 844, one for each data device. It may be noted, however, that not all data devices in a pool may include a device reservation list. As further discussed elsewhere herein, each of the data devices 831-834 may also include a free list (not shown), like that further discussed elsewhere herein.

In the illustrated example, the pool reservation container 810 (pool reservation container 1) indicates 39 track groups are reserved for use from the unallocated track groups of the pool 801, and the pool reservation container 820 (pool reservation container 2) indicates 23 track groups. Each of the device reserved lists 841-844 of the data devices 831-834 may include entries 841*a,b*, 842*a,b*, 843*a,b*, 844*a,b* corresponding to both of the pool reservation containers 810, 820. The entries of the device reserved lists 841-844 may identify reserved space on each of the data devices 831-834 for each pool reservation container 810, 820. Thin devices 851, 852, 853 may subscribe to the pool reservation containers 810, 820.

In an embodiment, only thin devices bound to the pool 801 may be subscribed to the one or more pool reservation containers 810, 820 of that pool. A subscription request from each thin device may include a number of track groups to be reserved for the device, although the actual number may be adjusted according to the number of track groups remaining in one or more device reserved lists associated with the request. It is further noted that a pool reservation container may be created upon a first subscription request from a bound thin device if a pool reservation container does not currently exist.

For example, the thin devices 851, 853 may subscribe to the pool reservation container 810 (container 1), which information may be included in header entries 851*a*, 853*a* of the thin devices 851, 853. Accordingly, the 39 unallocated track groups reserved by the pool reservation container 810 may be available to the thin devices 851, 853. Further, the thin devices 851, 853 may include header entries 851*b*, 853*b* with information of the track groups reserved by the thin devices 851, 853 (e.g., as included in the subscription requests sent by each of the thin devices 851, 853). The thin device 851 is illustrated as indicating 20 reserved track groups in the header entry 851*b*, and the thin device 853 is illustrated as indicating 11 reserved track groups in the header entry 853*b*. Similarly, the thin device 852 may subscribe to the pool reservation container 820 (container 2), which information may be included in a header entry 852a of the thin device 852. Accordingly, the 23 unallocated track groups reserved by the pool reservation container 820 may be available to the thin device 852. The thin device 852 may include a header entry 852b with information of the track groups reserved by the thin device 852 (e.g., as included in the subscription request sent by the thin device 852). The thin device 852 is illustrated as indicating 15 reserved track groups in the header entry 852b. Although not shown, other information, as further discussed elsewhere herein, may also be included in the thin device headers.

The total number of reserved track groups for each of the pool reservation container for a given pool may not exceed the total reserved capacity of the pool, as defined by the total number of reserved groups in all the device reserved lists for each pool reservation in the pool. For example, as shown, entries 841a-844a for the device reserved lists 841-844 corresponding to the pool reservation container 810 (container 1) each indicate reserved tracks groups on the data devices 831-834 (i.e. 10, 10, 9 and 10 track groups) that equal the total (39 track groups) indicated by the pool reservation container 810 that are available to thin devices 851, 853 subscribed to pool reservation container 810. Similarly, entries 841b-844b for the device reserved lists 841-844 corresponding to the pool reservation container 820 (container 2) each indicate reserved tracks groups on the data devices 831-834 (i.e. 6, 6, 6 and 5 track groups) that equal the total (23 track groups) indicated by the pool reservation container 820 that are available to the thin device 852 subscribed to pool reservation container 820.

Further, each of the pool reservation containers 810, 820 may indicate the number of track groups that have been reserved by subscribed thin devices 851-853. For example, as shown, of the 39 total track groups indicated as reserved from the pool 801 by the pool reservation container 810 (container 1), 31 track groups are identified as reserved by the subscribing thin devices 851, 853. Similarly, of the 23 total track groups indicated as reserved from the pool 801 by the pool reservation container 820 (container 2), 15 track groups are indicated as reserved by the subscribing thin device 852. Although not shown, other information, as further discussed elsewhere herein, may also be included in the pool reservation containers 810, 820. Additionally, in various embodiments, one or more of the thin devices 851-853 may subscribe to multiple pool reservation containers 810, 820 and the information reflecting multiple subscriptions may be appropriately identified in headers of the thin devices 851-853.

Figure 15:
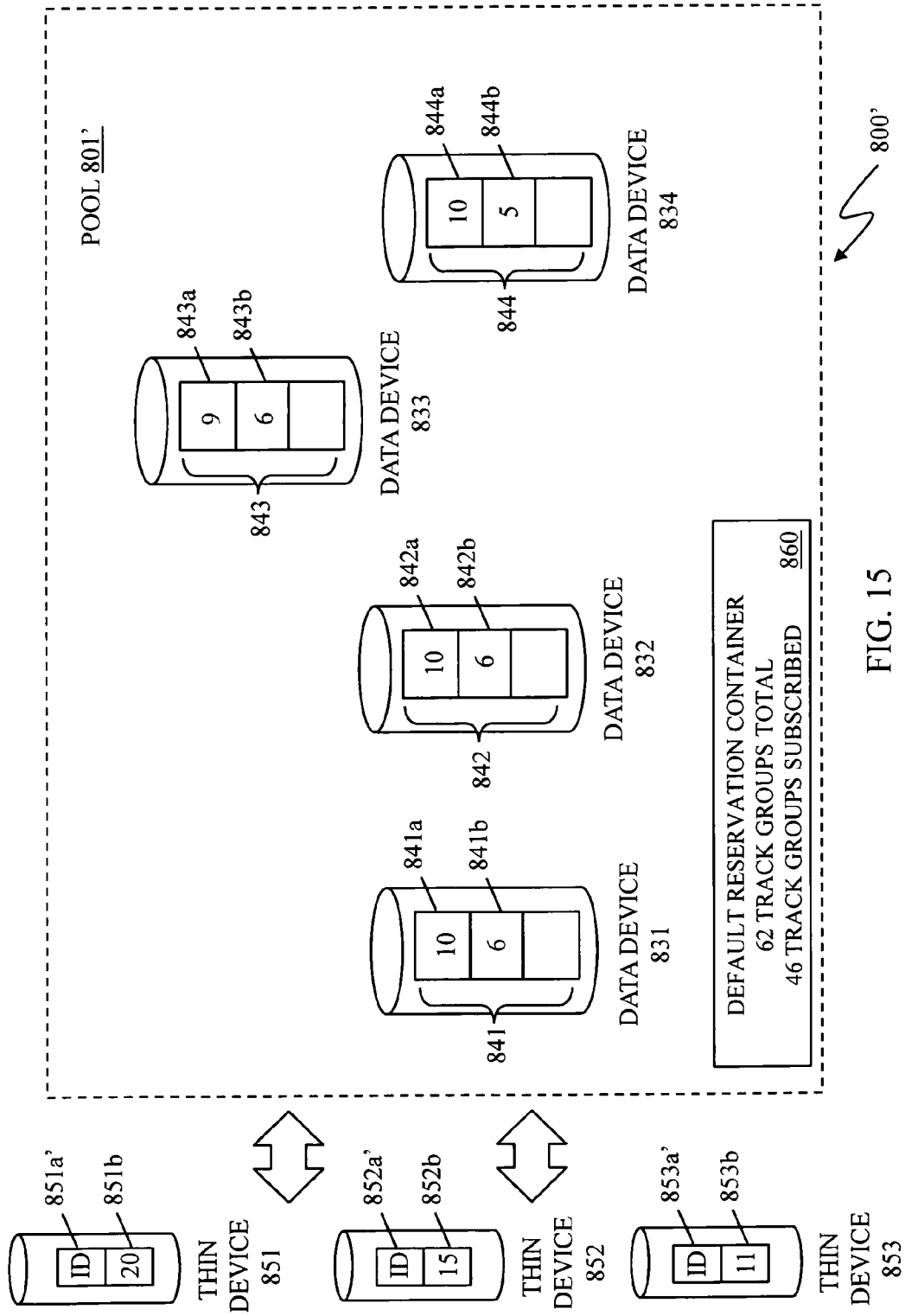
FIG. 15 is a schematic illustration according showing the pool as including a default reservation container according to an embodiment of the system described herein.

FIG. 15 is a schematic illustration 800' according to another embodiment of the system described herein having certain similar components as discussed in connection with the illustration 800 but showing a pool 801' as including a default reservation container 860. The default reservation container 860 may be a special kind of pool reservation container that may contain a value that represents a total number of track groups of all device reserved lists created in a given pool. Thus, there may be only one default reservation container created in a given pool. In an embodiment, only thin devices bound to the pool 801 may subscribe to the default reservation container 860 of the pool 801.

The default reservation container 860 may be created upon a first subscription request from a bound thin device, if the default reservation container does not exist yet. Information of the default reservation container 860 may be added to the pool data structure (and/or a separate data structure accessed by the pool 801') and may include: a default reservation container ID associated with the pool 801', a total reserved track groups counter in the pool 801' and a used (subscribed) reserved track groups counter in the pool 801. For example, the default reservation container 860 is shown as identifying 62 total track groups reserved from the pool 801'.

The thin devices 851-853 may subscribe to the default reservation container 860, which information may be included in header entries 851a', 852a', 853a' of the thin devices 851-853 (shown as "ID"). In an embodiment, since only one default reservation pool container 860 may be contained in the pool 801', an identification of the pool (e.g., the pool number) may be used as the container ID stored in the header entries 851a'-853a' of the subscribing thin devices 851-853. Accordingly, the 62 unallocated track groups reserved by the default reservation container 860 may be available to the thin devices 851-853. Similarly to the discussion involving the pool reservations containers 810, 820, the thin devices 851-853 may include header entries 851b-853b with information of the track groups reserved by the thin devices 851-853 (e.g., as included in the subscription requests sent by each of the thin devices 851-853) with respect to the default reservation container 860. For example, the thin device 851 is illustrated as indicating 20 reserved track groups in the header entry 851b, the thin device 852 is illustrated as indicating 15 reserved track groups in the header entry 852b, and the thin device 853 is illustrated as indicating 11 reserved track groups in the header entry 853b. Although not shown, other information, as further discussed elsewhere herein, may also be included in the thin device headers. The 46 track groups reserved by the subscribing thin devices 851-853 is shown in the information contained in the default reservation container 860.

Figure 16:
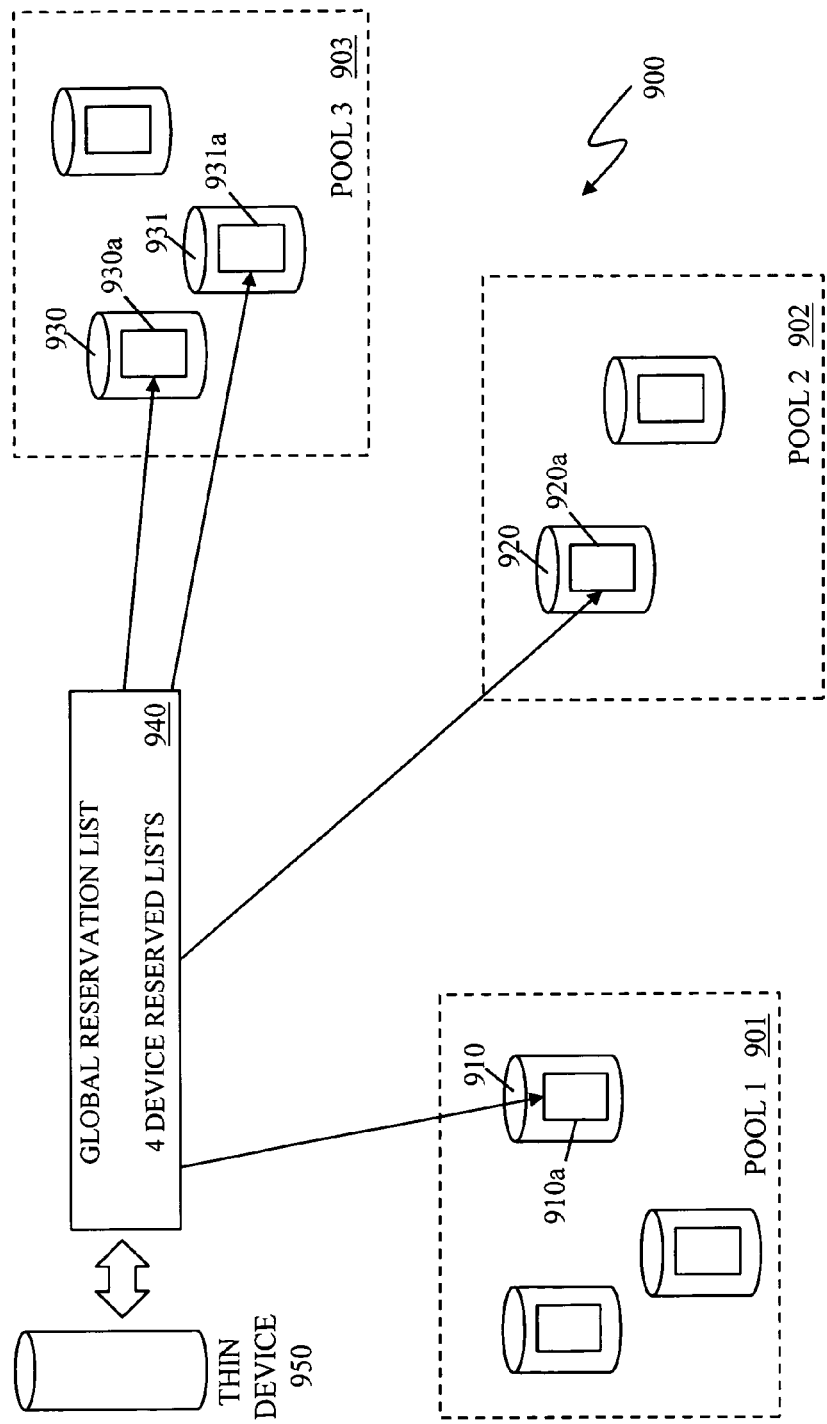
FIG. 16 is a schematic illustration showing use of a global reservation list according to an embodiment of the system described herein.

FIG. 16 is a schematic illustration 900 showing use of a global reservation list 940 according to an embodiment of the system described herein. The global reservation list 940 points to a number of device reserved lists 910a, 920a, 930a, 931a of data devices 910, 920, 930, 931 across multiple pools 901, 902, 903 (pool 1, pool 2 and pool 3). Unlike a pool reservation container, the global reservation list 940 may point to specific device reserved lists and specify which reserved groups will be consumed by a thin device 950 subscribed to the global reservation list 940. The global reservation list 940 may define a list of track groups combined from device reserved lists of data devices from one or more pools. Multiple global reservation lists may be created. In an embodiment, each device reserved list included in the global reservation list 940 may not be shared by other global reservation lists. Accordingly, when a device reserved list is included in the global reservation list 940, all track groups of the device reserved list are included in the global reservation list.

One or more thin devices, e.g. the thin device 950, may subscribe to the global reservation list 940 according to a reservation policy defined for the thin device 950, as further discussed elsewhere herein. A subscription request from the thin device 950 may include a number of track groups reserved for the thin device 950. The information structure of the global reservation list 940 may be included in the global memory 26 of one or more of storage devices according to the system described herein and/or in any other appropriate storage location, as further discussed elsewhere herein. The data for the global reservation list 940 may include: numbers of device reserved lists of data devices included in the global reservation list, a total reserved track groups counter in the global reservation list, a used (subscribed) reserved track groups counter in the global reservation list, a track groups limit in the global reservation list, and/or other appropriate information. As shown in the illustrated embodiment, the global reservation list 940 identifies four device reserved lists 910a, 920a, 930a, 931a across the multiple pools 901, 902, 903.

One or more reservation policies per thin device may be used according to the system described herein that define whether a particular thin device is allowed to subscribe to a reservation entity. For example, a default reservation policy may be that a thin device cannot subscribe to a pool to which the thin device is not bound. Other reservation policies may, however, be used in connection with the system described herein with respect to one or more thin device devices.

FIG. 17 is a flow diagram 1000 showing track group reservation processing according to an embodiment of the system described herein. At a step 1002, a thin device sends a subscription request to a reservation entity, like that further discussed elsewhere herein, and/or to a reservation control entity, for example as included in one or more control devices that control access to devices of one or more storage pools. The subscription request may include a number of track groups to be reserved for the thin device, and it noted that, as part of this step, the thin device may maintain header information identifying the number of tracks groups reserved for the thin device and the reservation entity. After the step 1002, processing proceeds to a step 1004 where the subscription request is received. After the step 1004, processing proceeds to a step 1006 where subscription requirements are determined including determining what type of subscription is being requested. As further discussed herein, the subscription request from the thin device may include a request for subscription to one or more pool reservation containers of a pool, including a default reservation container, and may also include a request for subscribing to a global reservation list that identifies device reserved lists across multiple pools. It is noted that a thin device that has already previously subscribed to the one or more lists/containers discussed herein may send a request that includes merely an updated number of track groups to be reserved according to the system described herein.

After the step 1006, processing proceeds to a step 1008 where track groups from one or more pools are reserved for allocation according to the requirements of the subscription request. In various embodiments, the device reserved lists on one or more of the data devices may be updated to indicate a number of track groups that are now reserved for the subscribing thin device by modifying header information of the data device. As further discussed elsewhere herein, the track groups reserved may include non-specific track groups and/or may include specific track group ranges depending upon the type of reservation entity to which the thin device is subscribed. After the step 1008, processing is complete.

According to various embodiments, one or more allocation policies may be used according to the system described herein that defines the order, relative to the free list, in which the reserved track groups are allocated to thin devices (i.e. consumed) during the allocation process. For example, a default allocation policy may include that the reserved track groups are allocated last during the allocation process. That is, in an embodiment, an allocation request under normal allocation processing to service I/O operations of a thin device may be filled initially, if possible, from the free list of a data device before drawing upon the device reserved list for a particular thin device. It is noted, however, that other appropriate allocation policies may be used in connection with the system described herein with respect to one or more thin device devices.

FIG. 18 is a flow diagram 1100 showing allocation processing according to an embodiment of the system described herein. At a step 1102, an allocation request is received corresponding to I/O requirements to be serviced for a requesting thin device. After the step 1102, processing proceeds to a step 1104 where data devices from one or more storage pools are determined in order to service the allocation request. After the step 1104, processing proceeds to a test step 1106 where it is determined whether the allocation request may be serviced from a free list of one or more of the identified data devices. If so, then processing proceeds to a step 1108 where the allocation request is serviced from the track groups of the one or more free lists. After the step 1108, processing is complete.

If at the test step 1106, it is determined that the allocation request cannot be serviced from the one or more free lists, then processing proceeds to a test step 1110 where it is determined whether the requesting thin device is subscribed to a reservation entity (i.e. container/list) corresponding to the identified data devices according to the system described herein. If not, then processing proceeds to a step 1112 where error processing and/or alternative processing is performed with respect to the allocation request of the requesting thin device. After the step 1112, processing is complete. If, at the test step 1110, it is determined that the requesting thin device is subscribed to the reservation entity, then processing proceeds to a step 1114 where track groups from the reservation entity corresponding to the requesting thin device are used to service the allocation request of the requesting thin device according to the system described herein. It is noted that, in other embodiments and depending on a particular allocation policy, the test step 1106 may be modified and/or eliminated if allocation requests are not to be serviced from the one or more free lists before applying the reservation entity processing according to the system described herein. After the step 1114, processing is complete.

Various embodiments discussed herein may be combined with each other in appropriate combinations in connection with the system described herein. Additionally, in some instances, the order of steps in the flowcharts, flow diagrams and/or described flow processing may be modified, where appropriate. Further, various aspects of the system described herein may be implemented using software, hardware, a combination of software and hardware and/or other computer-implemented modules or devices having the described features and performing the described functions. Software implementations of the system described herein may include executable code that is stored in a computer readable storage medium and executed by one or more processors. The computer readable storage medium may include a computer hard drive, ROM, RAM, flash memory, portable computer storage media such as a CD-ROM, a DVD-ROM, a flash drive and/or other drive with, for example, a universal serial bus (USB) interface, and/or any other appropriate tangible storage medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method for reserving storage space in a thin provisioning environment, comprising:
   maintaining a thin provisioning storage system having a plurality of thin devices and having a storage pool shared among a plurality of input/output (I/O) requesting devices, wherein each of the plurality of thin devices of the thin provisioning storage system presents to the I/O requesting devices an amount of storage space of the storage pool as being available and appearing pre-allocated to the I/O requesting devices for I/O operations, but wherein the thin provisioning storage system actually allocates the storage space from the storage pool only when requested by the I/O requesting devices to service I/O requests;

receiving, at a reservation entity that is a reservation device, a space reservation request from a first thin device of the plurality of thin devices, wherein the space reservation request identifies an amount of space requested for reservation for the first thin device from the storage pool, wherein the space reservation request is received prior to an I/O request sent by a first I/O requesting device of the plurality of I/O requesting devices requesting allocation of space from the storage pool of the thin provisioning storage system in connection with an I/O operation of the first I/O requesting device;

using the reservation entity to reserve space in the storage pool corresponding to the space reservation request from the first thin device, wherein the reserved space in the storage pool that is reserved by the reservation entity is usable for the first thin device and is not yet allocated to the first thin device, wherein the first thin device is one of a plurality of subscribing devices that subscribe to the reservation entity, wherein subscribing to the reservation entity enables the reservation entity to make available only to the plurality of subscribing devices reserved space in the storage pool that is designated by the reservation entity and is not yet allocated to any of the plurality of subscribing devices; and using the reservation entity in connection with allocating space in the thin provisioning storage system to service the I/O request involving the first I/O requesting device and the first thin device, wherein the I/O request is separate from the space reservation request, and wherein the I/O request corresponds to the I/O operation that is serviced using allocated space that is allocated from the storage pool for the first thin device, wherein the reserved space is allocated to service the I/O request only when sufficient free unallocated space in the storage pool to service the I/O request is unavailable, the free unallocated space being space that is not reserved by the reservation entity.

2. The method according to claim 1, further comprising:
maintaining information in the first thin device that identifies the reservation entity and the amount of space requested for reservation for the first thin device.

3. The method according to claim 1, wherein the reservation entity communicates with at least one device reserved list of a second device, the at least one device reserved list identifying reserved storage space on the second device.

4. The method according to claim 3, wherein the second device includes a data device.

5. The method according to claim 4, wherein the reservation entity communicates with a plurality of device reserved lists for a plurality of second devices.

6. The method according to claim 5, wherein the plurality of second devices are contained according to at least one of the following: (i) in the same storage pool or (ii) across multiple storage pools.

7. A non-transitory computer readable medium storing software for reserving storage space in a thin provisioning environment, the software comprising:

executable code that maintains a thin provisioning storage system having a plurality of thin devices and having a storage pool shared among a plurality of input/output (I/O) requesting devices, wherein each of the plurality of thin devices of the thin provisioning storage system presents to the I/O requesting devices an amount of storage space of the storage pool as being available and appearing pre-allocated to the I/O requesting devices for I/O operations, but wherein the thin provisioning storage system allocates the storage space from the storage pool only when actually requested by the I/O requesting devices to service I/O requests;

executable code that receives, at a reservation entity that is a reservation device, a space reservation request from a first thin device of the plurality of thin devices, wherein the space reservation request identifies an amount of space requested for reservation for the first thin device from the storage pool, wherein the space reservation request is received prior to an I/O request sent by a first I/O requesting device of the plurality of I/O requesting devices requesting allocation of space from the storage pool of the thin provisioning storage system in connection with an I/O operation of the first I/O requesting device;

executable code that uses the reservation entity to reserve space in the storage pool corresponding to the request from the first thin device, wherein the reserved space in the storage pool that is reserved by the reservation entity is usable for the first thin device and is not yet allocated to the first thin device, wherein the first thin device is one of a plurality of subscribing devices that subscribe to the reservation entity, wherein subscribing to the reservation entity enables the reservation entity to make available only to the plurality of subscribing devices reserved space in the storage pool that is designated by the reservation entity and is not yet allocated to any of the plurality of subscribing devices; and executable code that uses the reservation entity in connection with allocating space in the thin provisioning storage system to service the I/O request involving the first I/O requesting device and the first thin device, wherein the I/O request is separate from the space reservation request, and wherein the I/O request and corresponds to the I/O operation that is serviced using allocated space that is allocated from the storage pool for the first thin device, wherein the reserved space is allocated to service the I/O request only when sufficient free unallocated space in the storage pool to service the I/O request is unavailable, the free unallocated space being space that is not reserved by the reservation entity.

8. The non-transitory computer readable medium according to claim 7, further comprising:
executable code that maintains information in the first thin device that identifies the reservation entity and the amount of space requested for reservation for the first thin device.

9. The non-transitory computer readable medium according to claim 7, wherein the reservation entity communicates with at least one device reserved list of a second device, the at least one device reserved list identifying reserved storage space on the second device.

10. The non-transitory computer readable medium according to claim 9, wherein the second device includes a data device.

11. The non-transitory computer readable medium according to claim 9, wherein the reservation entity communicates with a plurality of device reserved lists for a plurality of second devices.

12. The non-transitory computer readable medium according to claim 11, wherein the plurality of second devices are contained according to at least one of the following: (i) in the same storage pool or (ii) across multiple storage pools.

13. A method for allocating storage space in a thin provisioning environment, comprising:
maintaining a thin provisioning storage system having a plurality of thin devices and having a storage pool shared among a plurality of input/output (I/O) requesting devices, wherein each of the plurality of thin devices of the thin provisioning storage system presents to the I/O requesting devices an amount of storage space of the storage pool as being available and appearing pre-allocated to the I/O requesting devices for I/O operations, but wherein the thin provisioning storage system allocates the storage space from the storage pool only when actually requested by the I/O requesting devices to service I/O requests;
providing a reservation entity, the reservation entity being a reservation device to which the plurality of thin devices subscribe by submitting space reservation requests to the reservation entity to reserve space in the storage pool, wherein subscribing to the reservation entity enables the reservation entity to make available only to the plurality of subscribing devices the reserved space in the storage pool that is designated by the reservation entity and is not yet allocated to any of the plurality of subscribing devices;
receiving at a first thin device of the plurality of thin devices an allocation request from a first I/O requesting device of the plurality of I/O requesting devices to allocate space in the storage pool in connection with servicing an I/O operation of the first I/O requesting device, wherein the first thin device is one of the plurality of subscribing devices that subscribe to the reservation entity, wherein, prior to the first I/O requesting device sending the allocation request, the first thin device sends a space reservation request to the reservation entity requesting reservation of space in the storage pool of the thin provisioning storage system, and wherein the allocation request is separate from the space reservation request; and
allocating space according to a policy involving the reservation entity that reserves the reserved space in the storage pool according to the space reservation request of the first thin device subscribing to the reservation entity, the space being allocated corresponding to the I/O operation of the first I/O requesting device, wherein the reservation entity determines whether to allocate the reserved space in the storage pool to service the allocation request, wherein the reserved space is allocated to service the allocation request only when sufficient free unallocated space in the storage pool to service the allocation request is unavailable, the free unallocated space being space that is not reserved by the reservation entity.

14. The method according to claim 13, wherein the reservation entity communicates with at least one device reserved list of a second device, the at least one device reserved list identifying reserved storage space on the second device.

15. The method according to claim 14, wherein the second device includes a data device.

16. The method according to claim 14, wherein the reservation entity communicates with a plurality of device reserved lists for a plurality of second devices.

17. The method according to claim 16, wherein the plurality of second devices are contained in the same storage pool.

18. The method according to claim 16, wherein the plurality of second devices are contained across multiple storage pools.

19. A non-transitory computer readable medium storing software for allocating storage space in a thin provisioning environment, the software comprising:
executable code that maintains a thin provisioning storage system having a plurality of thin devices and having a storage pool shared among a plurality of input/output (I/O) requesting devices, wherein each of the plurality of thin devices of the thin provisioning storage system presents to the I/O requesting devices an amount of storage space of the storage pool as being available and appearing pre-allocated to the I/O requesting devices for I/O operations, but wherein the thin provisioning storage system allocates the storage space from the storage pool only when actually requested by the I/O requesting devices to service I/O requests;
executable code that provides a reservation entity to which the plurality of thin devices subscribe by submitting space reservation requests to the reservation entity to reserve space in the storage pool, wherein subscribing to the reservation entity enables the reservation entity to make available only to the plurality of subscribing devices reserved space in the storage pool that is designated by the reservation entity and is not yet allocated to any of the plurality of subscribing devices;
executable code that receives at a first thin device of the plurality of thin devices an allocation request from a first I/O requesting device of the plurality of I/O requesting devices to allocate space in the storage pool in connection with servicing an I/O operation of the first I/O requesting device, wherein the first thin device is one of the plurality of subscribing devices that subscribe to the reservation entity, wherein, prior to the first I/O requesting device sending the allocation request, the first thin device sends a space reservation request to the reservation entity requesting reservation of space in the storage pool of the thin provisioning storage system, and wherein the allocation request is separate from the space reservation request; and
executable code that allocates space according to a policy involving the reservation entity, the reservation entity identifying reserved space in the storage pool according to the space reservation request of the first thin device subscribing to the reservation entity and the space being allocated corresponding to the I/O operation of the first I/O requesting device, wherein the reservation entity determines whether to allocate the reserved space in the storage pool to service the I/O operation, wherein the reserved space is allocated to service the allocation request only when sufficient free unallocated space in the storage pool to service the allocation request is unavailable, the free unallocated space being space that is not reserved by the reservation entity.

20. The non-transitory computer readable medium according to claim 19, wherein the reservation entity communicates with at least one device reserved list of a second device, the at least one device reserved list identifying reserved storage space on the second device.

21. The non-transitory computer readable medium according to claim 20, wherein the second device includes a data device.

22. The non-transitory computer readable medium according to claim 20, wherein the reservation entity communicates with a plurality of device reserved lists for a plurality of second devices.

23. The non-transitory computer readable medium according to claim 22, wherein the plurality of second devices are contained in the same storage pool.

24. The non-transitory computer readable medium according to claim 22, wherein the plurality of second devices are contained across multiple storage pools.

* * * * *